(12) United States Patent
Ebrahimi Afrouzi

(10) Patent No.: US 12,324,963 B1
(45) Date of Patent: Jun. 10, 2025

(54) SMART GYM EQUIPMENT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/981,186

(22) Filed: Dec. 13, 2024

Related U.S. Application Data

(63) Continuation of application No. 18/976,729, filed on Dec. 11, 2024, which is a continuation of application No. 18/781,093, filed on Jul. 23, 2024, which is a continuation of application No. 17/550,986, filed on Dec. 14, 2021, now Pat. No. 12,053,674, which is a continuation of application No. 16/372,471, filed on Apr. 2, 2019, now abandoned.

(60) Provisional application No. 62/656,803, filed on Apr. 12, 2018.

(51) Int. Cl.
| | |
|---|---|
| *A63B 24/00* | (2006.01) |
| *G06F 3/0482* | (2013.01) |
| *G06N 3/08* | (2023.01) |
| *G06N 20/00* | (2019.01) |

(52) U.S. Cl.
CPC ........ *A63B 24/0087* (2013.01); *G06F 3/0482* (2013.01); *G06N 3/08* (2013.01); *G06N 20/00* (2019.01)

(58) Field of Classification Search
CPC .... A63B 24/0087; G06F 3/0482; G06N 3/08; G06N 20/00
See application file for complete search history.

(56) References Cited

U.S. PATENT DOCUMENTS

| | | | | |
|---|---|---|---|---|
| 6,071,216 A | * | 6/2000 | Giannelli | A63B 21/4035 482/136 |
| 6,142,917 A | * | 11/2000 | Giannelli | A63B 23/1209 482/136 |
| 6,254,516 B1 | * | 7/2001 | Giannelli | A63B 23/1209 482/136 |

(Continued)

FOREIGN PATENT DOCUMENTS

| | | |
|---|---|---|
| AU | 2009100694 A4 | 8/2009 |
| CN | 101791466 B | 2/2013 |

(Continued)

*Primary Examiner* — Garrett K Atkinson

(57) ABSTRACT

Provided is a device, comprising: a smart gym equipment, comprising: one or more sensors; one or more actuators; one or more electric magnets; a processor; and a tangible, non-transitory, machine-readable media storing instructions that when executed by the processor effectuates operations comprising: adjusting resistance in continuous amounts during a weight-lifting training in relation to a pulled distance of a weight value, wherein a change of the weight value is proportional to the pull distance; and the weight value is adjusted by an adjustment in an electrical current flowing through a wire in the smart gym equipment thereby adjusting a strength of a magnetic field; wherein: the processor determines a value for the electrical current; the adjustment in the electrical current based on at least one sensed data; and the device receives and transmits data to an application of a communication device paired with the device.

29 Claims, 26 Drawing Sheets

(56) References Cited

U.S. PATENT DOCUMENTS

| | | | |
|---|---|---|---|
| 6,287,243 B1* | 9/2001 | Isom | A63B 21/4029 482/130 |
| 7,364,535 B1* | 4/2008 | Rosenow | A63B 21/4033 482/142 |
| 7,473,211 B2* | 1/2009 | Lee | A63B 21/063 482/97 |
| D612,437 S * | 3/2010 | Fenster | D21/675 |
| D613,350 S * | 4/2010 | Fenster | D21/675 |
| 7,717,836 B1* | 5/2010 | Miller | A63B 21/00 482/142 |
| 7,753,830 B1* | 7/2010 | Marsh | A63B 23/03525 482/142 |
| 9,610,476 B1* | 4/2017 | Tran | A63F 11/00 |
| 9,849,364 B2* | 12/2017 | Tran | G16H 40/63 |
| 10,022,614 B1* | 7/2018 | Tran | G16H 50/20 |
| 10,883,844 B2* | 1/2021 | Ogale | G06N 3/08 |
| 11,199,853 B1* | 12/2021 | Afrouzi | B25J 13/006 |
| 11,876,464 B2* | 1/2024 | Li | H02P 21/22 |
| 2003/0092543 A1* | 5/2003 | Giannelli | A63B 21/4035 482/99 |
| 2005/0032614 A1* | 2/2005 | Keiser | A63B 21/4029 482/142 |
| 2006/0058156 A1* | 3/2006 | Cohen | A63B 24/00 482/4 |
| 2008/0176713 A1* | 7/2008 | Olivera Brizzio | A63B 24/00 482/8 |
| 2009/0075791 A1* | 3/2009 | Kissel | A63B 21/155 482/93 |
| 2011/0256983 A1* | 10/2011 | Malack | A63B 21/4015 482/4 |
| 2015/0148203 A1* | 5/2015 | Rios Sodeyama | A63B 21/00076 482/112 |
| 2017/0232300 A1* | 8/2017 | Tran | G06F 1/163 434/247 |
| 2018/0200605 A1* | 7/2018 | Syed | A63B 69/3605 |
| 2019/0033085 A1* | 1/2019 | Ogale | G01C 21/3446 |
| 2019/0077007 A1* | 3/2019 | Mallinson | A61B 5/1128 |
| 2020/0266743 A1* | 8/2020 | Li | H02P 21/0014 |
| 2020/0375529 A1* | 12/2020 | Kasuya | A61B 5/6828 |

FOREIGN PATENT DOCUMENTS

| | | |
|---|---|---|
| CN | 102451544 B | 8/2013 |
| CN | 103956174 A | 7/2014 |
| CN | 105931325 A | 9/2016 |
| CN | 106897783 A | 6/2017 |
| CN | 107583261 A | 1/2018 |
| CN | 107993700 A | 5/2018 |
| CN | 207420112 U | 5/2018 |
| CN | 207458369 U | 6/2018 |
| CN | 207924830 U | 9/2018 |
| CN | 108961859 A | 12/2018 |

* cited by examiner 0 lbs    20 lbs    25 lbs

Avatar will be animated according to the target weight

Incomplete reps are highlighted with an icon

2206

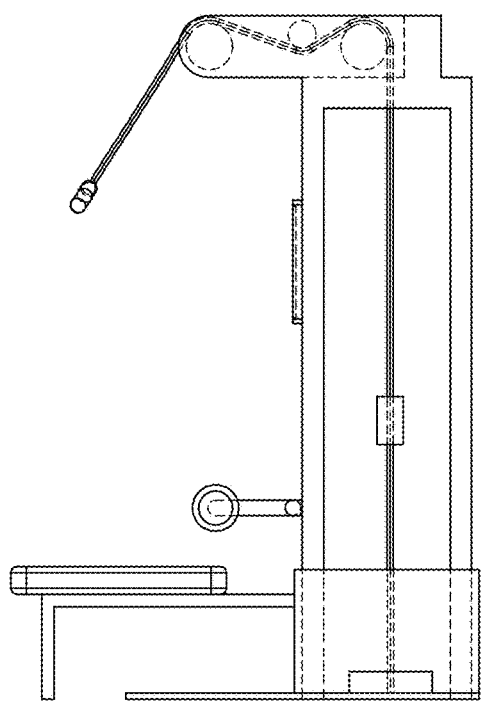
FIG. 22E
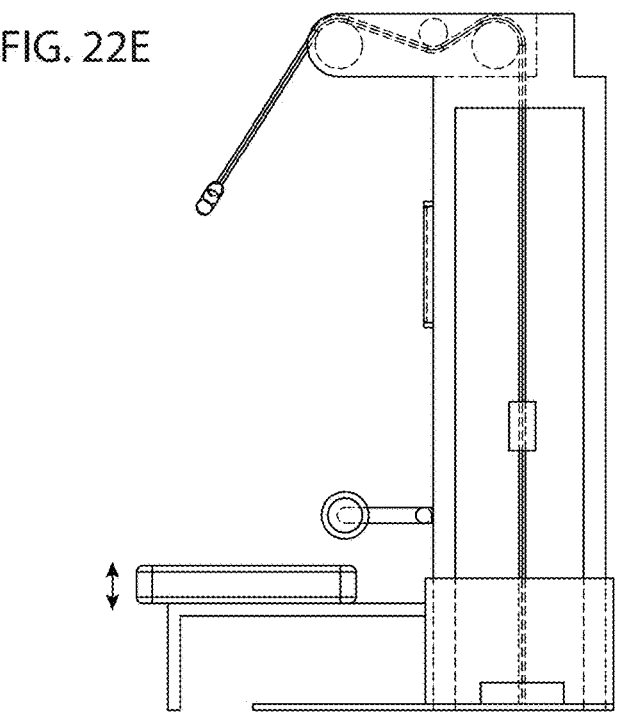
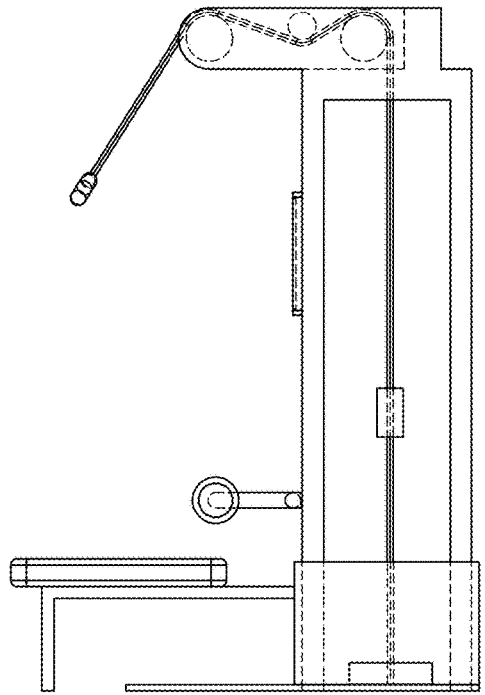
FIG. 22F
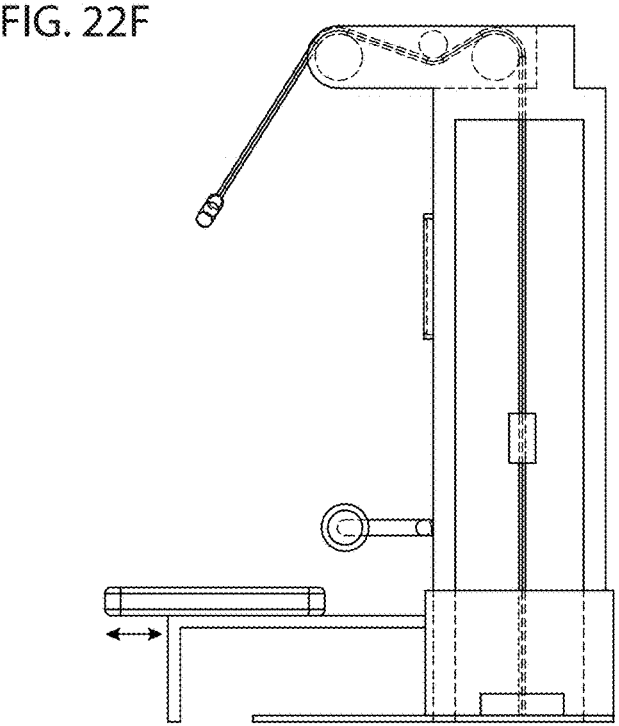

FIG. 27
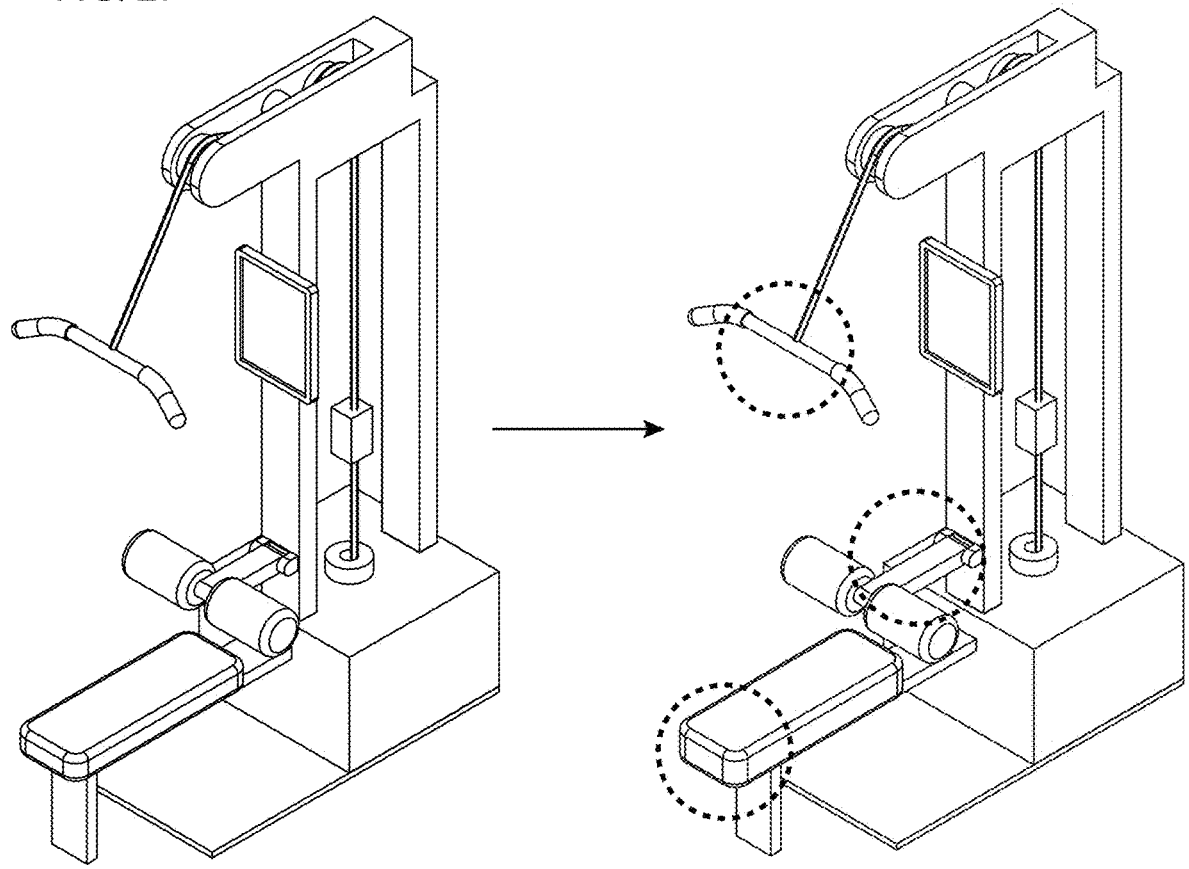
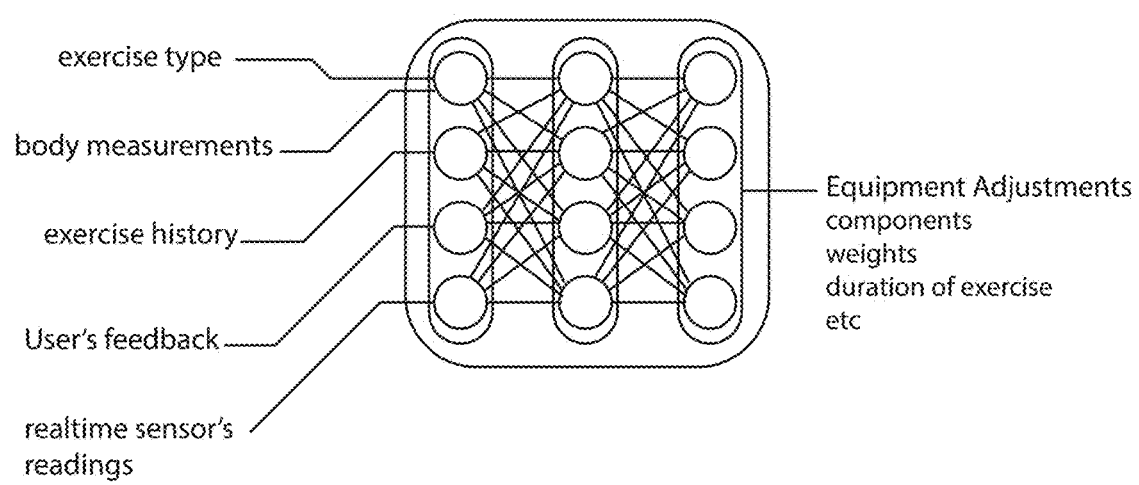
FIG. 28

SMART GYM EQUIPMENT

CROSS-REFERENCE TO RELATED APPLICATIONS

This application is a Continuation-In-Part of U.S. patent application Ser. No. 18/976,729, filed on Dec. 11, 2024, which is a Continuation of U.S. patent application Ser. No. 18/781,093, filed July which is a Continuation of U.S. patent application Ser. No. 17/550,986, filed Dec. 14, 2021, which is a Continuation of U.S. patent application Ser. No. 16/372,471, filed Apr. 2, 2019, which claims the benefit of U.S. Provisional Patent Application No. 62/656,803, filed Apr. 12, 2018, each of which is hereby incorporated by reference.

In this patent, certain U.S. patents, U.S. patent applications, or other materials (e.g. articles) have been incorporated by reference. The text of such U.S. patents, U.S. patent applications, and other materials are, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to a smart gym equipment.

BACKGROUND

The majority of gym equipment is manual. A person exercising is required to manually adjust the weight on an exercise machine or choose a specific free weight based on their weight-lifting abilities. At times this can be cumbersome, as estimating your own weight-lifting abilities and weight-lifting limits can be difficult. Furthermore, throughout an exercise routine, the weight-lifting ability and weight-lifting limit of a person can change due to, for example, increased tiredness with increased repetition In other instances, a person may not be able to achieve their true weight-lifting limit due to safety concerns the person may have (e.g., an absence of a spotter, injury).

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a device, comprising: a smart gym equipment, comprising: one or more sensors; one or more actuators; one or more electric magnets; a processor; and a tangible, non-transitory, machine-readable media storing instructions that when executed by the processor effectuates operations comprising: adjusting resistance in continuous amounts during a weight-lifting training in relation to a pulled distance of a weight value, wherein a change of the weight value is proportional to the pull distance; and the weight value is adjusted by an adjustment in an electrical current flowing through a wire in the smart gym equipment thereby adjusting a strength of a magnetic field; wherein: the processor determines a value for the electrical current; the adjustment in the electrical current based on at least one sensed data; and the device receives and transmits data to an application of a communication device paired with the device.

BRIEF DESCRIPTION OF THE DRAWINGS

FIGS. 22A-22H illustrate examples of various configurations of the adjustable components of a smart gym equipment, according to some embodiments.

FIG. 27 illustrates an automatic adjustment of components on a smart gym equipment based on a user profile, according to some embodiments.

FIG. 28 is a schematic diagram of an example of neural networks determining equipment settings based on user inputs using machine learning.

DETAILED DESCRIPTION OF SOME EMBODIMENTS

Figure 1A:
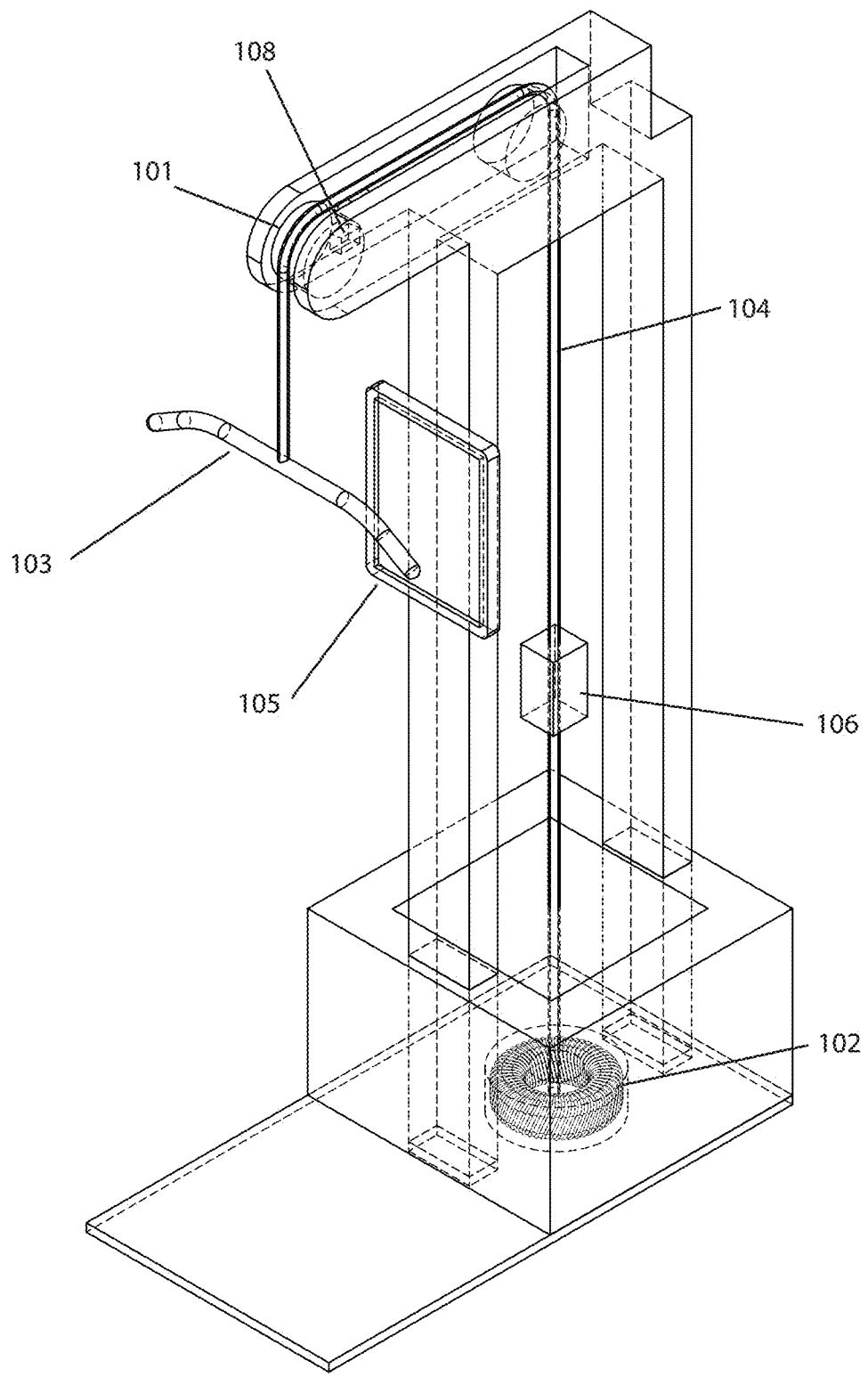
FIG. 1A illustrates a schematic diagram of a smart gym equipment, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well-known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

The present invention introduces a system for gym equipment that utilizes smart technology. In some embodiments, the equipment may utilize various sensor arrangements in order to transmit information to a processor. In some embodiments, various sensors can measure force, acceleration of strings or cables being utilized in the equipment which are connected to weights. In some embodiments, sensors can sense other information as well such as how far the weight values have been lifted. For instance, if a user is struggling and has only been able to pull a weight half the travel distance of the maximum distance, a sensor may sense this information, process the data and send it to the processor where it may be catalogued.

In some embodiments, the equipment will utilize the processor to process information regarding the user. The equipment may utilize magnets, electrical currents, and the like to facilitate the actions that the smart technology implements. In one embodiment, the electric magnets may create a magnetic field. The magnetic field can aid in lightening or increasing the heaviness of the weights. In some embodiments, an electrical current through a wire can adjust the weight, in such a way that a user can have continuous amounts of weight.

In some embodiments, the equipment may collect data every time a user utilizes the equipment. Such information may include what time the machine was used, what the date was, who the user was, what exercise the equipment was utilized for, what weight value was utilized, how long the equipment was utilized for when it was used, how far the user was able to pull at a certain weight value, and the like. Such information can be utilized with machine learning in order to make predictions and recommendations as to what workout routine may be conducted.

In some embodiments, the equipment may utilize a machine learning algorithm in order to predict what the user may need. In some embodiments, the device may utilize a machine learning algorithm with deep neural networks. Over a period of time, all user data may be collected, and the device may learn and make recommendations to users about what weight or exercise should be utilized as well as predict what a user may wish to partake in workout-wise. In some embodiments, the machine learning algorithm may assist in determining what a user's maximum weight value efficiency is. Every time a given user utilizes a certain weight value the machine learning algorithm may collect this data. Over time this compiled data may shed light on a user's routines, ability level, tendencies, and the like. The device may be able to assist a user with pushing themselves to their maximum degree in order to achieve a greater level of exercisability.

In some embodiments, the device may be paired with an application, having a touch screen, or some other interactivity, where a user can interact with the device. In such a situation, a user may be able to set selections for the device. For example, a user may be able to preset a certain weight value by pushing a button and then the device may utilize that certain weight value. For a device that is a multi-workout device, for example, a device that utilizes both back muscle group exercises as well as arm muscle group exercises, a user may be able to select which exercise they wish to partake in. Additionally, a device may ask a first-time user a set of questions such as age, weight, exercise history or ability, and the like, in order to render a recommendation to the user as to what weight class that user may utilize. A user may be able to reject or accept such a recommendation.

In some embodiments, a user may be able to select what workout routine they may take part in and the device may prepare itself ahead of time for each routine. For instance, a user may select a workout routine by doing an arm muscle group workout routine for the day. The user may select bicep curl, tricep curl, and another type of bicep curl each with three sets of 10 repetitions each. Once a user has reached the threshold of the repetition and number of sets for each, the smart gym device may switch itself to the next workout routine for the user. Alternatively, the device may come with a preset list of workouts and the user may select what type of muscle group they wish to work out in. Once that selection is made, the smart gym device may let the user know what workout is to be conducted and for how many repetitions.

In some embodiments, the device may come with a training program in order to help a user know how to properly conduct a workout routine so as not to injure themselves. The device may be paired with an application or have a screen as well as speakers on the device itself which has videos on it to show how a user is to conduct a particular workout on the device being utilized.

In some embodiments, utilizing machine learning algorithms may use deep neural networks. In some embodiments, the machine may observe how a human trainer or coach trains and assists users over many repetitions of training examples. Once the machine learns this information, it may be able to replicate these same patterns and train other users. In some embodiments, the device may make recommendations to a user based on data that has been collected. FIG. 1 depicts an example of smart gym equipment.

Some embodiments provide smart gym equipment including one or more sensors, actuators, pulleys, magnets, handles, weights, cables, a screen, and a processor. In some embodiments, the one or more sensors include force sensors, weight sensors, accelerometers, optical encoders, optical sensors, extensometers, and the like. For example, a person may perform weight-lifting exercises by pulling on a handle attached to an end of a cable, wherein the cable is coupled with a pulley. In this example, a sensor may measure the pull or push force from the person, or an optical encoder coupled with the pulley may measure the travel distance of the handle. In some embodiments, the processor receives data from the one or more sensors and executes actions based on the data received. For example, halfway through the full range of motion, the processor may reduce or increase the weight value being lifted by the person. In some embodiments, the smart gym equipment includes electric magnets that are used to increase or decrease the weight value being lifted by the person. In some embodiments, a weight is created with a wire and the processor adjusting an amount of electrical current flowing through the wire to increase or decrease the strength of a magnetic field. For example, the processor may increase the magnetic field from a first weight value being lifted by the person to a second weight value, or decrease the second weight value towards the first weight value in continuous amounts of weight values, while the weight is being lifted by the person.

In some embodiments, the processor stores sensor data collected by the one or more sensors in a memory. In some embodiments, other types of data are stored. In some embodiments, the processor stores data for one or more persons using the smart gym equipment and determines unique equipment settings for each person based on the sensor data received. In some embodiments, each unique equipment setting for a person using the smart gym equipment may be stored in an individual user profile. In some embodiments, data stored for a person can include the person using the machine, age of the person using the machine, the weight and height of the person using the machine, exercise goals of the person using the machine (e.g., duration of exercise, target number of repetitions for a particular exercise, target weight of the person using the machine, target lifting weight for a particular exercise, etc.), time and date of use, exercises performed, weight lifted for each exercise performed, duration of each exercise performed, the number of repetitions for each exercise performed, the level of completion of each repetition performed, maximum weight lifted for each exercise performed, duration of total exercise session, and the like. Equipment settings can include, for example, a particular exercise, a number of repetitions for a particular exercise, a magnitude of weight value for a particular exercise, a duration for performing a particular exercise, change in the magnitude of weight value during a particular exercise and at which repetition the change is implemented, the order of exercises performed during an exercise session, total duration of an exercise session, the television channel or program to be displayed on a screen, a height of a component of the smart gym equipment for a particular exercise, an angle of a component of the smart gym equipment for a particular exercise, a position of a component of the smart gym equipment for a particular exercise, and the like. Examples of components of the smart gym equipment can include a handle, a bench, a seat, a pulley, a strap, and the like.

In some embodiments, a person inputs data and chooses equipment settings using a user interface of the smart gym equipment (e.g., touchscreen), an application of a communication device (e.g., mobile device, tablet, laptop, desktop computer, etc.) paired with the processor of the smart gym equipment, or other devices with a user interface and capable of communicating with the processor of the smart gym equipment. For example, in some embodiments, a person may use the user interface to input their weight, age, height, medical history, exercise goals, and the like upon their first use of the smart gym equipment. In another example, the person may use the user interface to choose the magnitude of a weight value for lifting for a particular exercise, and the processor adjusts the smart gym equipment to the weight value chosen by the person. In another example, the person uses the user interface to choose a particular exercise from a repertoire of different available exercises. In some embodiments, the processor prepares the machine for a particular exercise. In some embodiments, the person is presented with suggested exercises for an exercise session (e.g., based on exercise history, sensor data, fitness level, weight, age, etc.) and uses the user input to accept or decline. In another example, the person chooses one or more exercises, the magnitude of weight value for lifting for each exercise, and the number of repetitions for each exercise using the user interface. In some embodiments, the processor adjusts the smart gym equipment for the next exercise after the number of repetitions for the current exercise has been reached. Adjustments to the smart gym equipment can include, for example, adjustment of pulleys, adjustment in the magnitude of the weight value for lifting, adjustment of cables, adjustment of handles attached to the cable, adjustment of a seat, adjustment of a bench, and the like. In another example, the person selects a particular muscle group using the user interface of the smart gym equipment or the application of a communication device, and a selection of possible exercise routines for that muscle group including multiple exercises are presented to the person on the display screen of the user interface for the person to choose from. In some embodiments, the person watches a demonstration (e.g., a video including audio displayed on a user interface of the smart gym equipment, in which case the smart gym equipment may include speakers of a particular exercise on the display screen of the user interface or the application of the communication device.

In some embodiments, the processor uses machine learning with neural networks to determine unique equipment settings for a person based on input data (FIG. 28). In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the machine is trained through a machine learning process with input data points in order to determine a suitable equipment setting for a person based on the input data provided. In some embodiments, the machine training observes a weight-lifting training of the person manually choosing the equipment settings while the processor simultaneously receives input data from the one or more sensors of the smart gym equipment. In some embodiments, the processor learns a function that relates input data to the equipment settings for the particular person. In some embodiments, different input data are assigned different importance weights based on their importance in predicting the desired equipment settings. In some embodiments, during the weight-lifting training the processor predicts a suitable equipment setting using the currently learned function, and compares the suitable prediction to the actual equipment settings chosen by the person. In some embodiments, the processor determines a prediction error and backpropagates the error through the neural network, thereby adjusting the learned function. In some embodiments, the error is backpropagated by adjusting the importance weight assigned to different types of sensor input. In some embodiments, the processor uses a tracking error gradient descent to reduce the error. In some embodiments, the machine training is performed for a predetermined amount of time, or until the success rate or the error of the suitable equipment settings predicted by the neural network is above or below a predetermined threshold, respectively.

In some embodiments, the person uses the user interface to rate one or more suitable equipment settings predicted by the processor. In some embodiments, the processor adjusts the learned function based on the ratings received. In some embodiments, the processor suggests suitable equipment settings to the person, and the person accepts or declines the suggested equipment settings using the user interface. In some embodiments, the processor adjusts the learned function based on the response to the suggestions provided to the person. In some embodiments, the processor adjusts the learned function by adjusting the importance weight assigned to different types of input data based on the ratings or responses to the suggestions provided to the person. In some embodiments, the processor adjusts the learned function each time the predicted suitable equipment setting is adjusted by the person.

In some embodiments, the neural network implements a Markov Decision Process in learning the relationship between equipment settings and input data. In some embodiments, the processor assigns a reward each time a positive feedback from a user is received. In some embodiments, the processor assigns a penalty each time a negative feedback from a user is received. Examples of feedback include a change or no change in equipment settings chosen by the processor, user ratings, user response to suggestions, etc. In some embodiments, different types of feedback or feedback for the different equipment settings have different magnitudes of reward or penalty. In some embodiments, the processor minimizes a cost function or maximizes a reward function to optimize the function predicting equipment settings.

In some embodiments, the processor learns weight training methods used by a trainer or a coach of a person using the techniques described herein. In some embodiments, a person chooses a training mode of the smart gym equipment, and the processor chooses exercise routines according to the learned weight training methods. In some embodiments, the processor learns the weight training methods of particular trainers and the person chooses a particular trainer (e.g., based on their weight training methods). In some embodiments, the user interface displays pre-recorded or live-feed videos of the trainer during exercise sessions. In some embodiments, the trainer is financially compensated by the person when chosen. In some embodiments, the person compensates the trainer using the user interface by making an electronic payment.

Figure 1B:
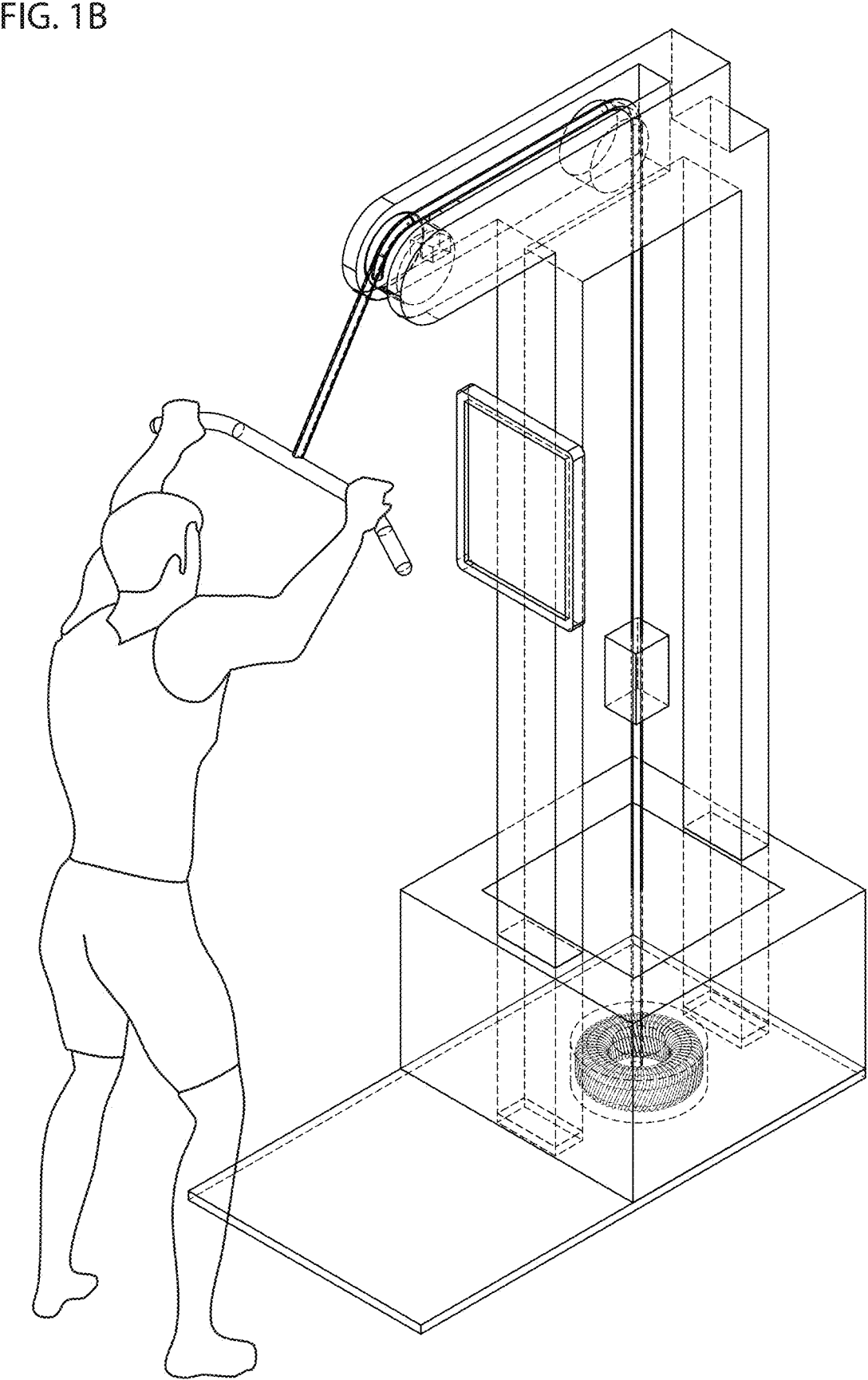
FIG. 1B is an example of a smart gym equipment being utilized by a person, according to some embodiments.

FIG. 1A illustrates an example of a smart gym equipment 100 with pulleys 101, electric magnets 102, handles 103, cables 104, and a screen 105. In some embodiments, smart gym equipment 100 includes a weight sensor 106 attached to cables 104. In some embodiments, smart gym equipment 100 includes a weight sensor 106 to measure acceleration of the cables 104 during an exercise. In some embodiments, smart gym equipment 100 passes electricity to an electric magnet 102 along a wire to create weight values. A processor adjusts the magnitude of electrical current to adjust the magnetic field to reduce or increase the amount of weight lifted by a person. Smart gym equipment 100 also includes a memory and an optical encoder 108 positioned on or coupled with the pulley to measure the travel distance of the handles 103. FIG. 1A is merely an example of a smart gym equipment. Several configurations are possible. For example, in other configurations position, angle, and height of any components of the smart gym equipment may be adjustable. FIG. 1B is an example of a person utilizing a smart gym equipment. In this example, a person is performing weight-lifting exercises by pulling the handle connected to cables arranged in a pulley system.

Figure 2:
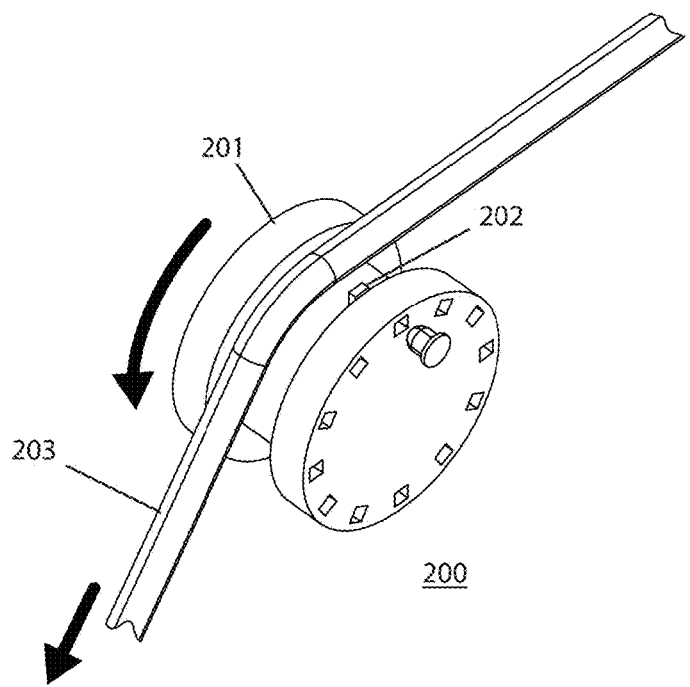
FIG. 2 is a schematic diagram of an encoder of a smart gym equipment, according to some embodiments.
Figure 3:
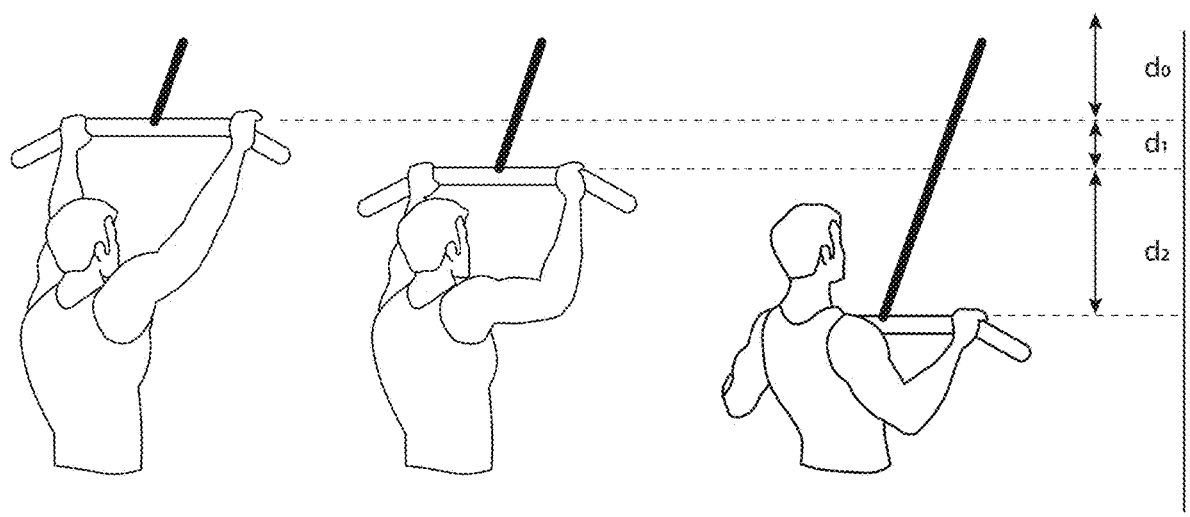
FIG. 3 illustrates an example of a process for adjusting weights by a smart gym equipment through distance measurements, according to some embodiments.
Figure 4A:
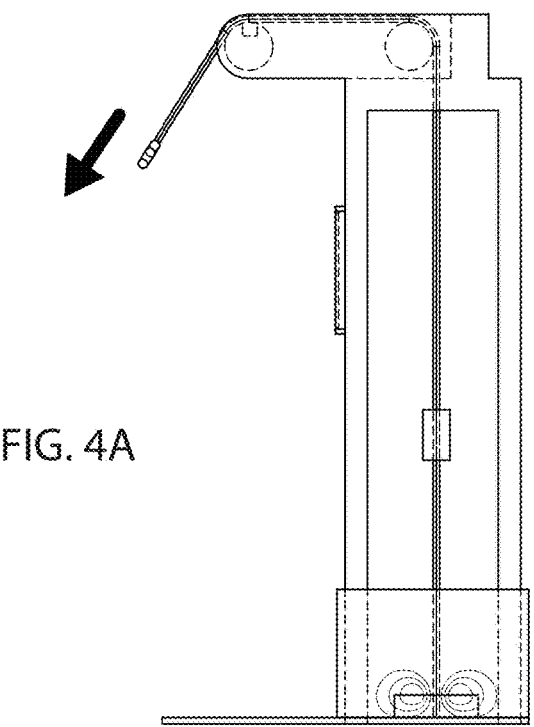
FIGS. 4A and 4B illustrate a schematic diagram of electric magnets providing weight values in a smart gym equipment, according to some embodiments.
Figure 4B:
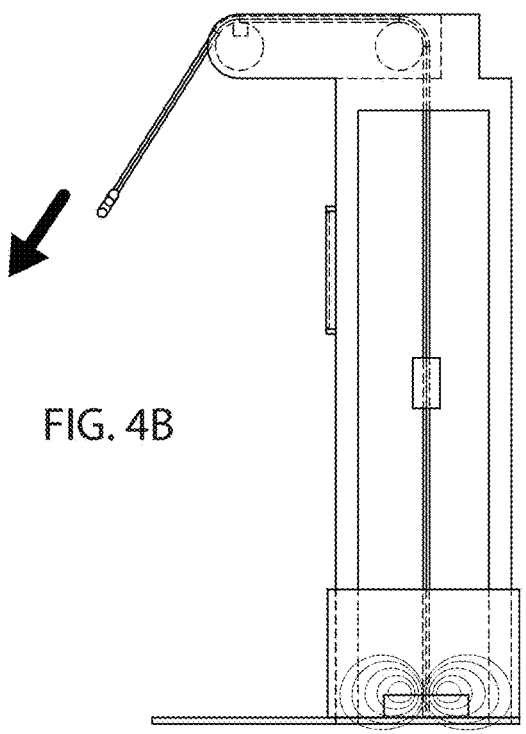

FIG. 2 illustrates a schematic diagram of an optical encoder 200 coupled with a pulley 201. In some embodiments, the optical encoder includes a sensor 202. In this example, the optical encoder 200 measures the pull or push force of the cables 203 running through the pulley 201. FIG. 3 illustrates an example of a person using the smart gym equipment wherein travel distances of the handle from an initial position ($d_0$), towards a first position ($d_1$), and a second position ($d_2$) are measured by the optical encoder. In some embodiments, the processor receives measured data from the optical encoder and executes actions based on the measured data received. In one example, the processor decreases (FIG. 4A) or increases (FIG. 4B) the weight value being lifted by a person.

Figure 5:
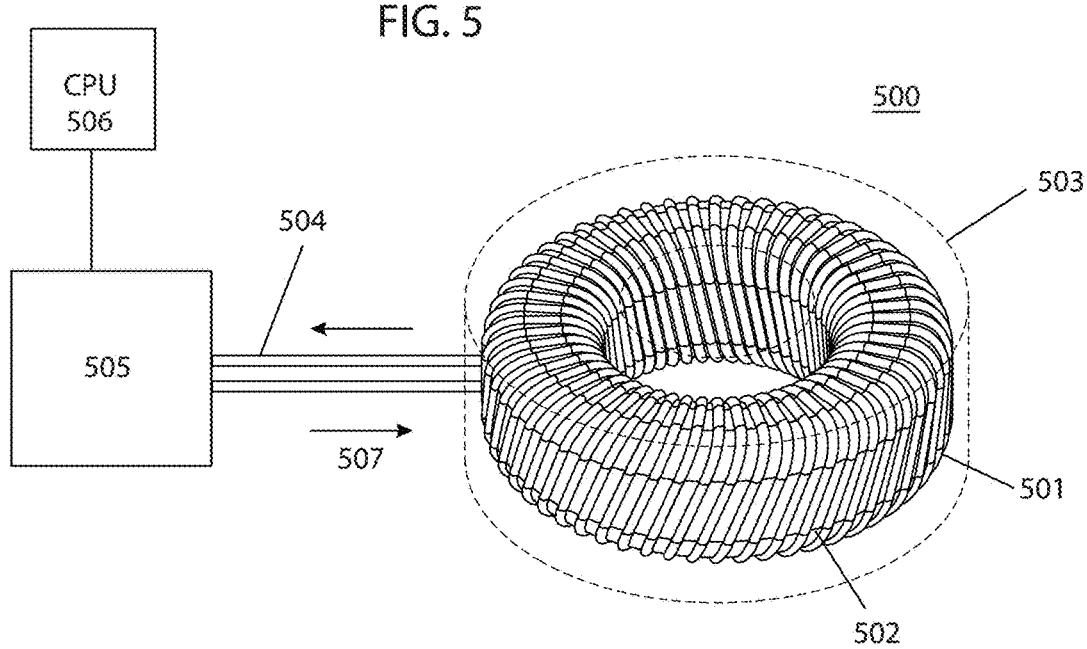
FIG. 5 is a schematic diagram of an electric magnet, according to some embodiments.
Figure 6:
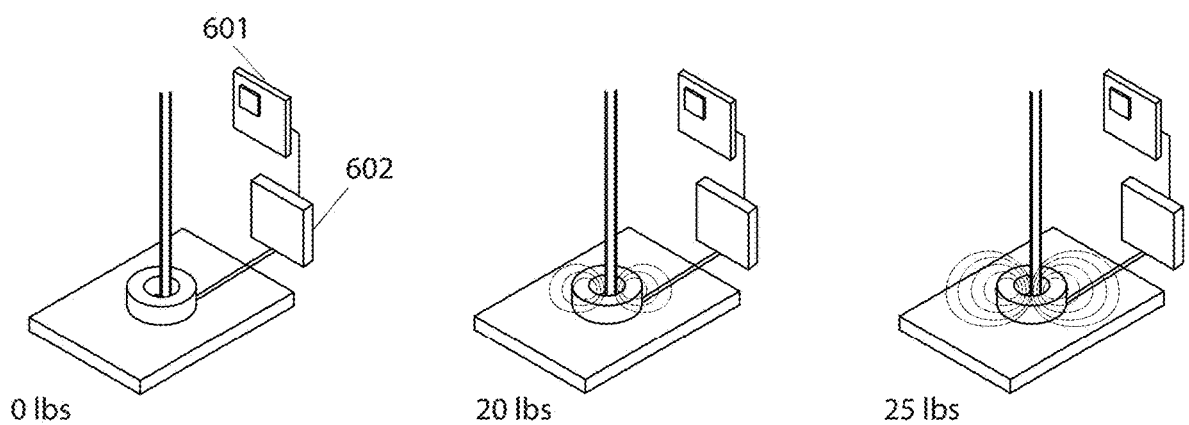
FIG. 6 illustrates an example of a correlation of the current adjustment with a magnetic field, according to some embodiments.

FIG. 5 illustrates a schematic diagram of an electric magnet that increases or decreases the weight value being lifted by the person. In some embodiments, the electric magnet includes coils 501 and a core 502 enclosed in a casing 503. The electric magnet is connected to a wire 504 and further connected to power supply 505 and a processor 506 that adjusts electrical currents 507 flowing through the wire 504 controlling the strength of a magnetic field. FIG. 6 illustrates an example of various magnetic fields, enabled by a power supply 601 and a processor 602, with an initial weight value (0 lbs) to a first weight value (20 lbs) being lifted by the person, slowly decreasing the first weight value towards the initial weight value or slowly increasing the first value towards a second weight value (25 lbs), while the weight is being lifted by the person.

Figure 7:
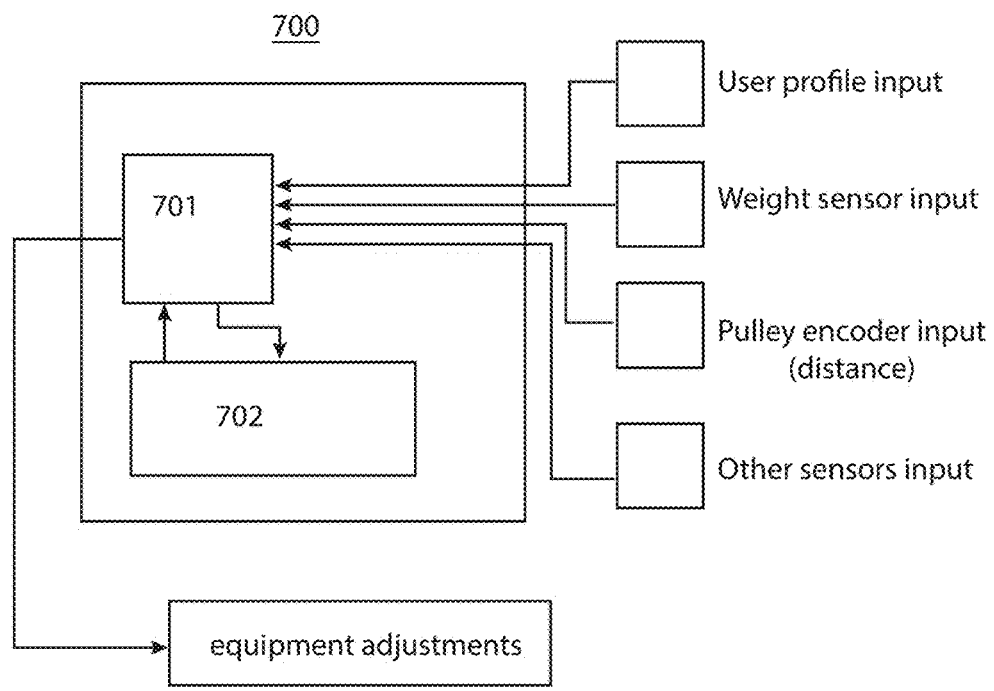
FIG. 7 is a schematic diagram of a processor block, according to some embodiments.

FIG. 7 illustrates a schematic diagram of a processor block 700. In some embodiments, the processor block 700 includes a central processing unit 701 and a memory 702. The central processing unit 701 receives sensor data, such as user profile input, weight sensor input, pulley encoder input, and the like, collected by the one or more sensors in the memory 702. In some embodiments, the central processing unit 701 determines equipment setting adjustments.

Figure 8:
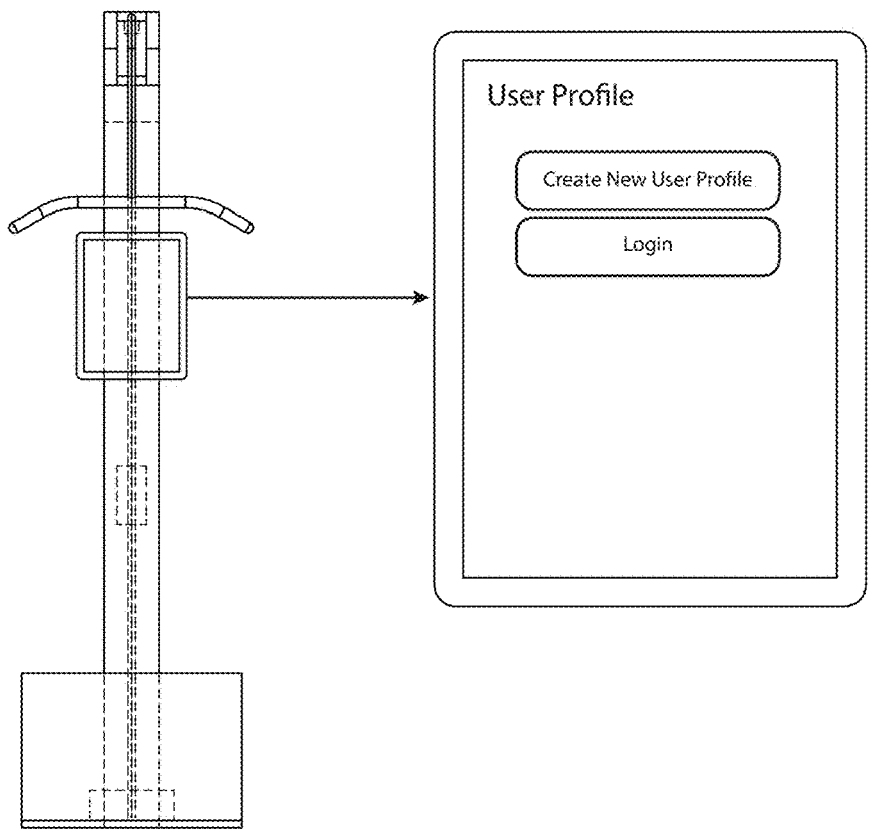
FIG. 8 illustrates an example of a user interface of a smart gym equipment to create or select a profile, according to some embodiments.
Figure 9:
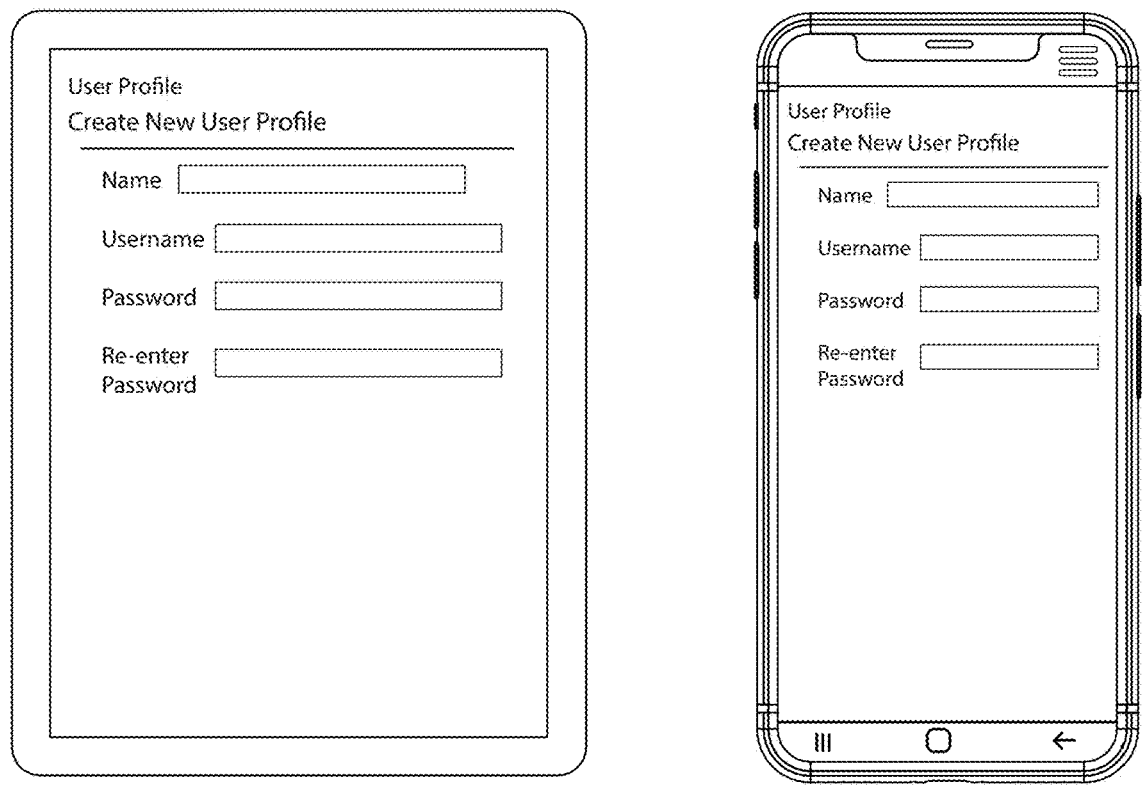
FIGS. 9-11 illustrate an example of creating a new profile on a user interface of a smart gym equipment or of a communication device, according to some embodiments.
Figure 10:
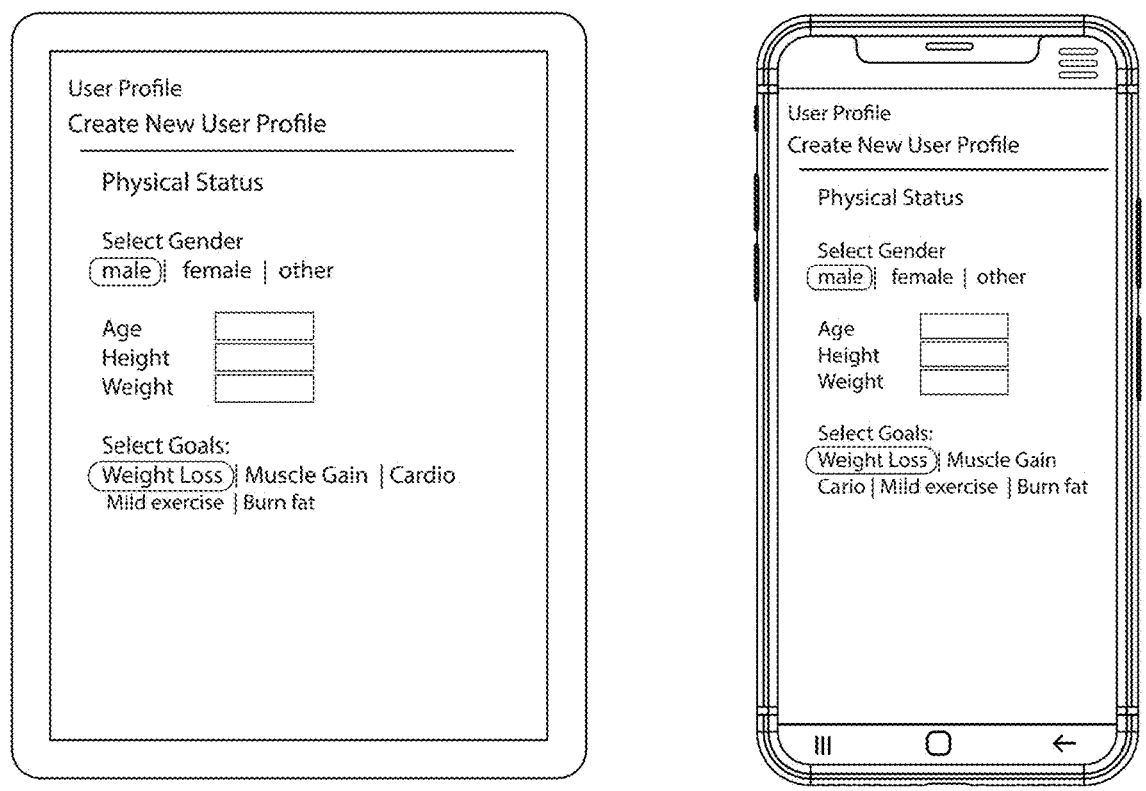
Figure 11:
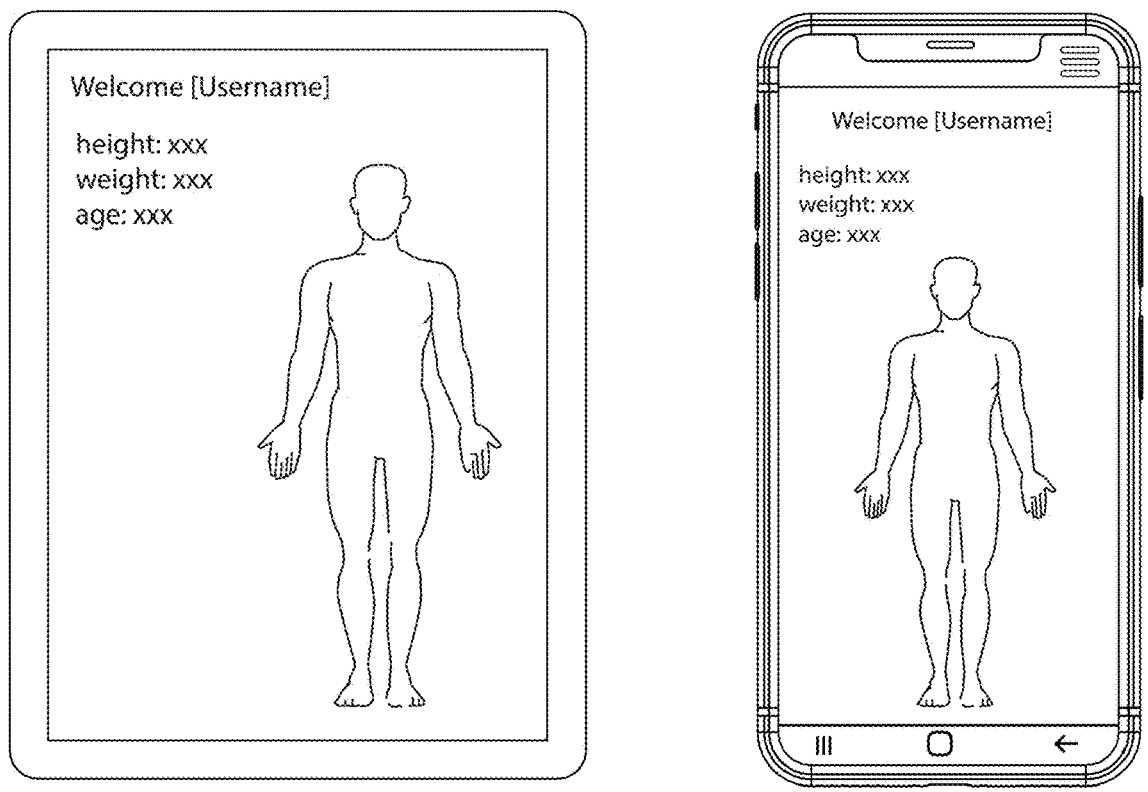
Figure 12:
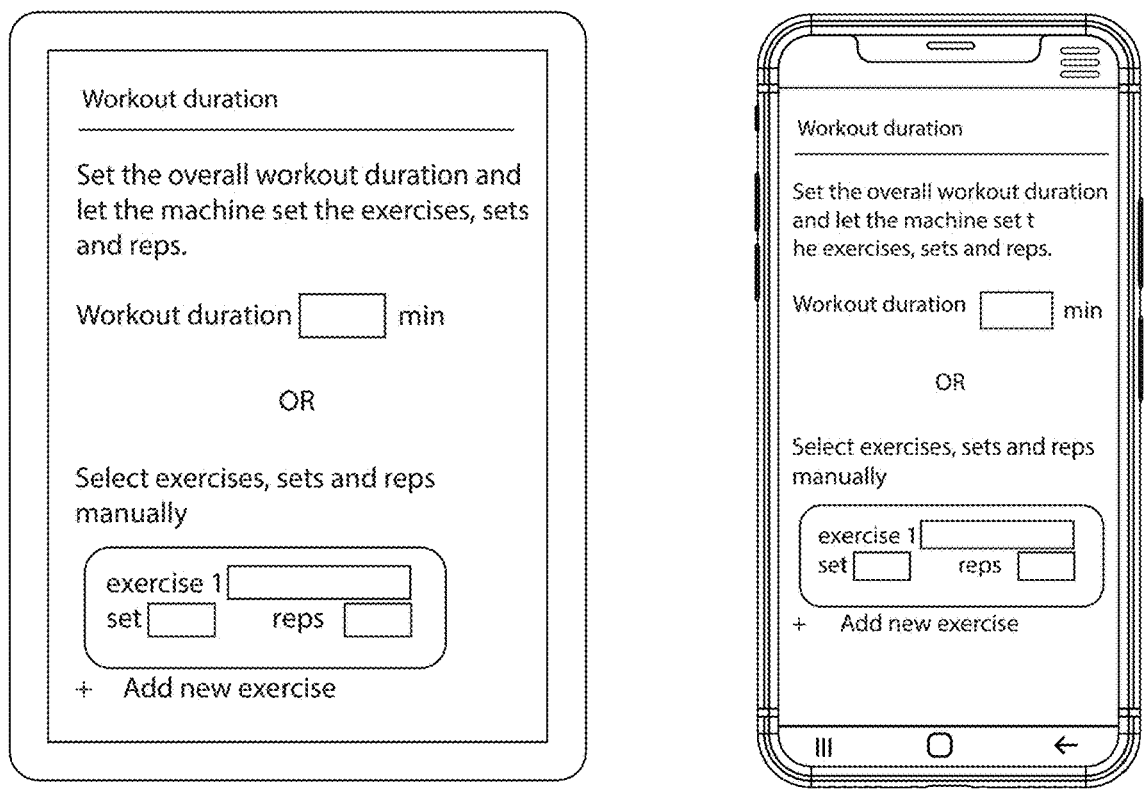
FIGS. 12-20 illustrate a user interface of a smart gym equipment or of a communication device receiving information, selecting exercise settings, showing user progress and suggestions, and customizing a profile based on user inputs, according to some embodiments.
Figure 13:
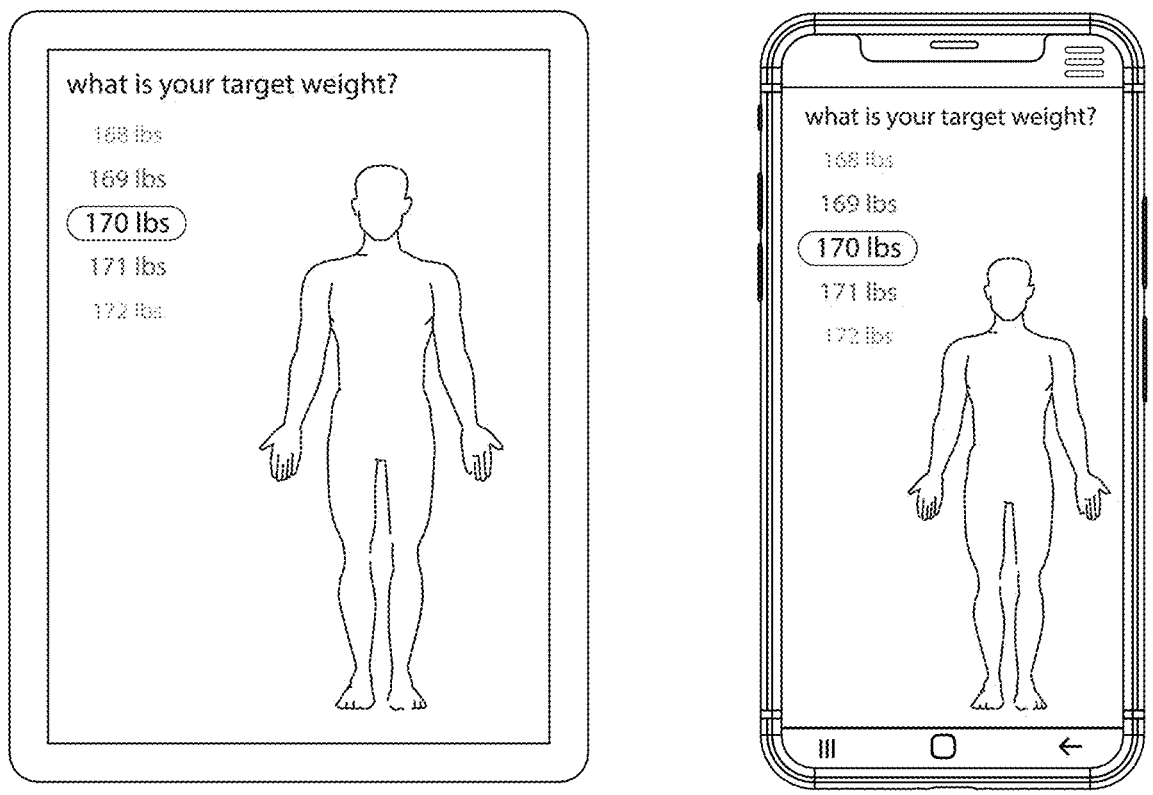
Figure 14:
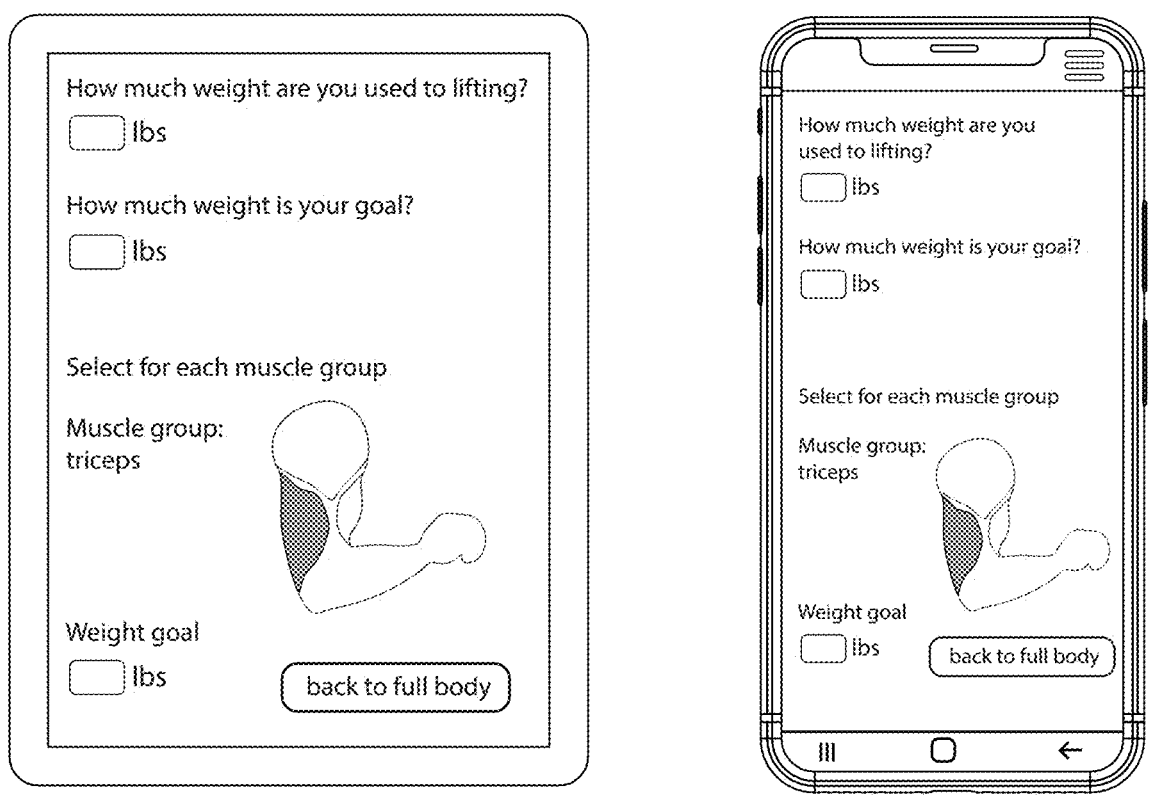
Figure 15:
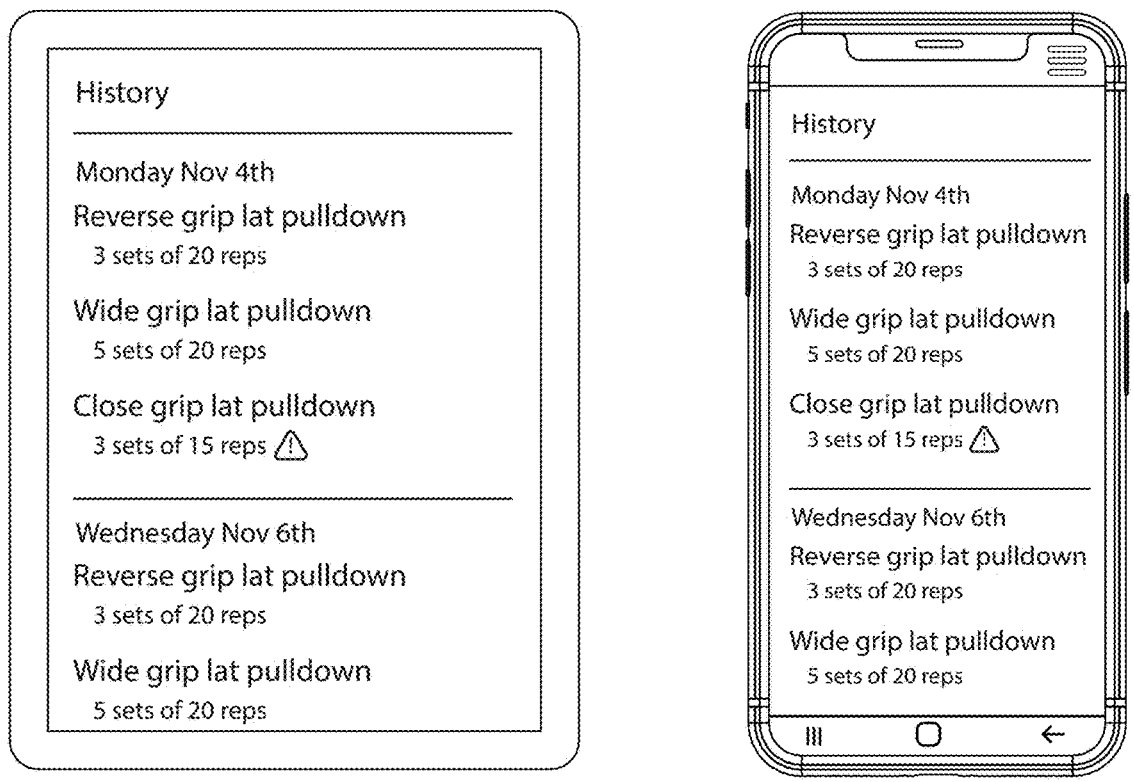
Figure 16:
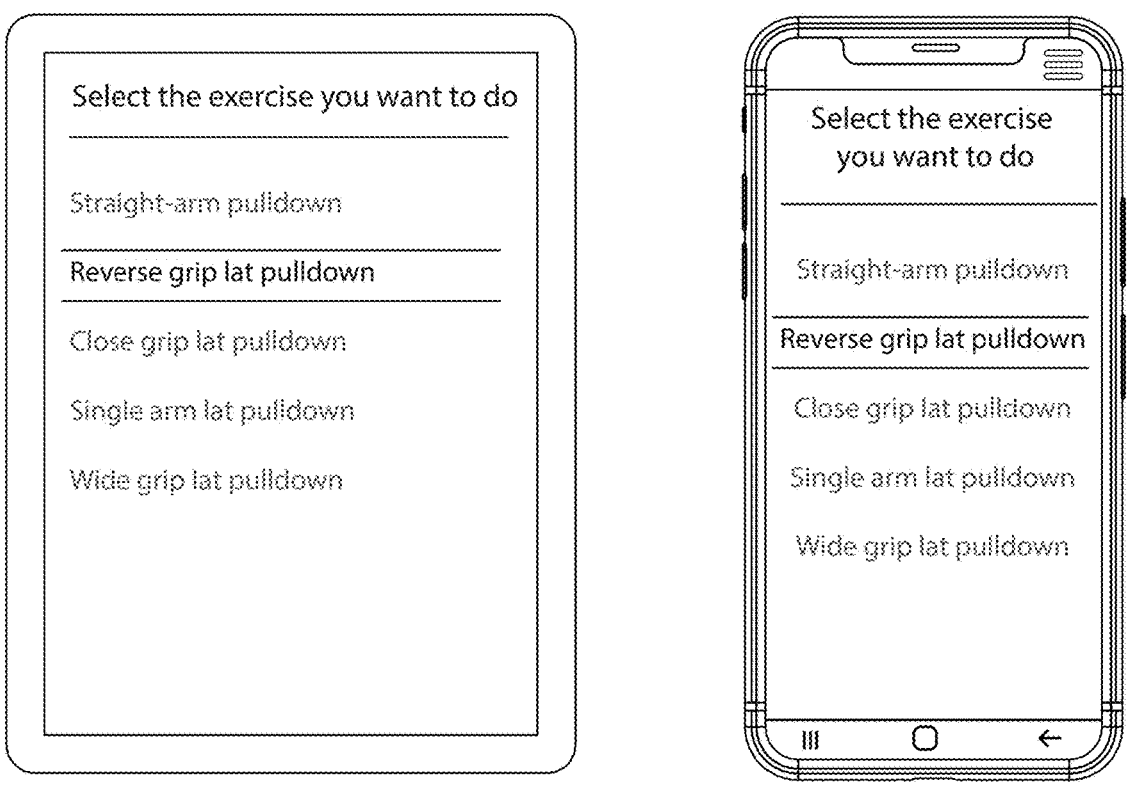
Figure 17:
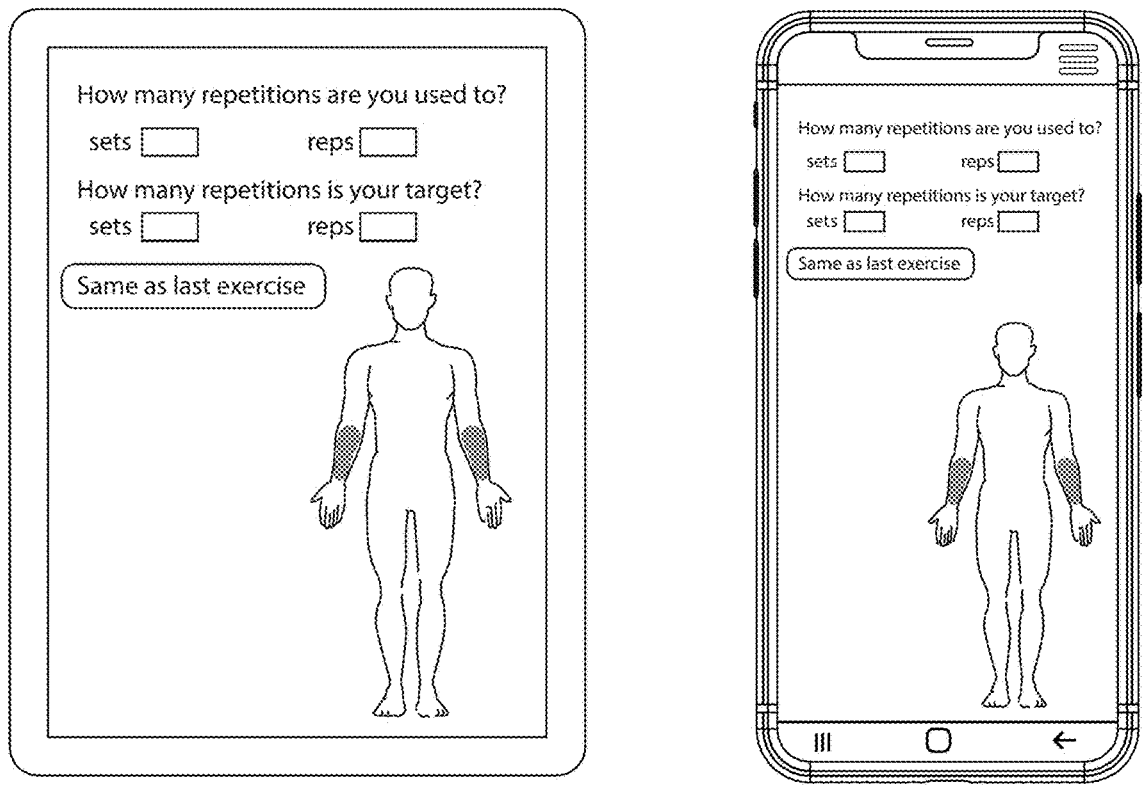
Figure 18:
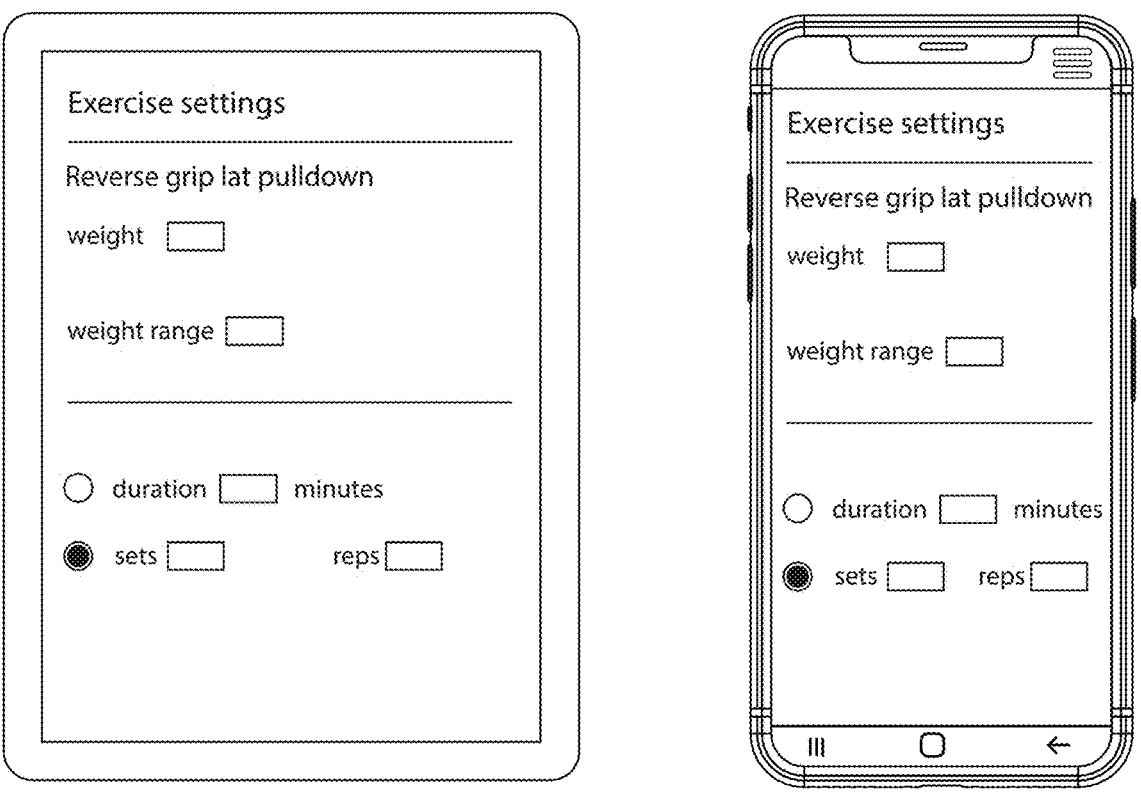
Figure 19:
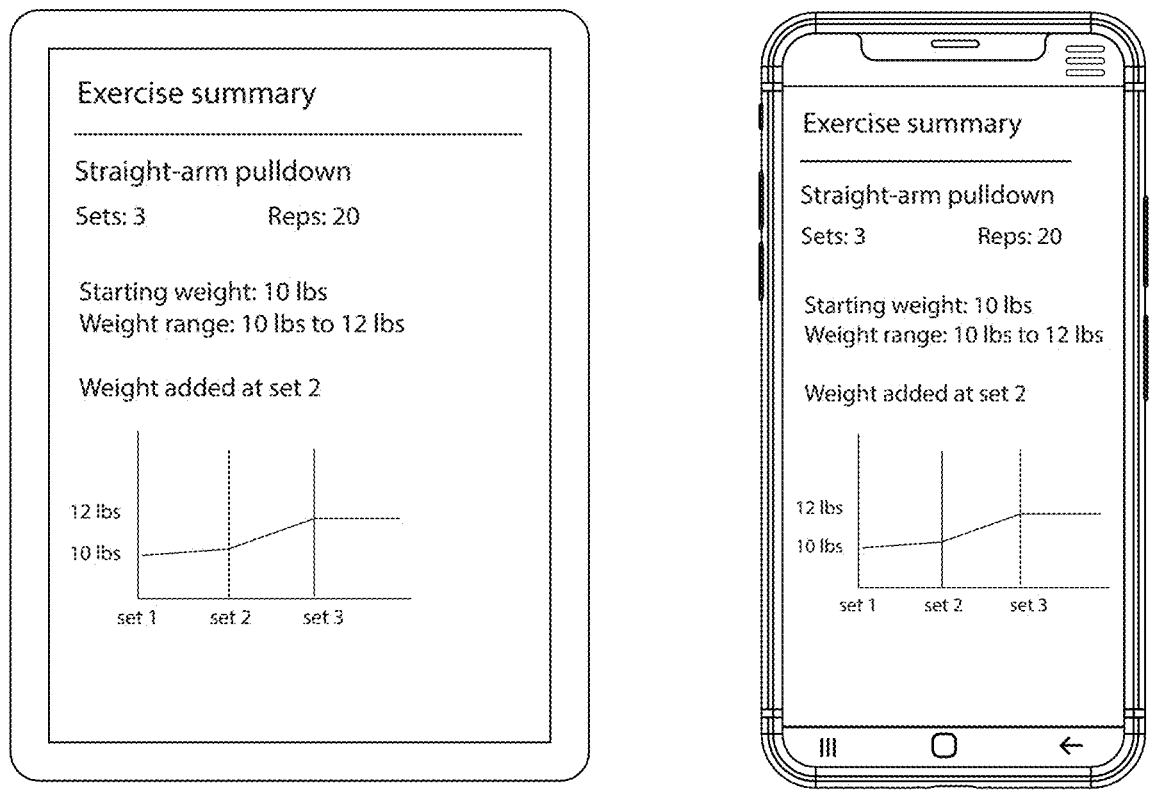
Figure 20:
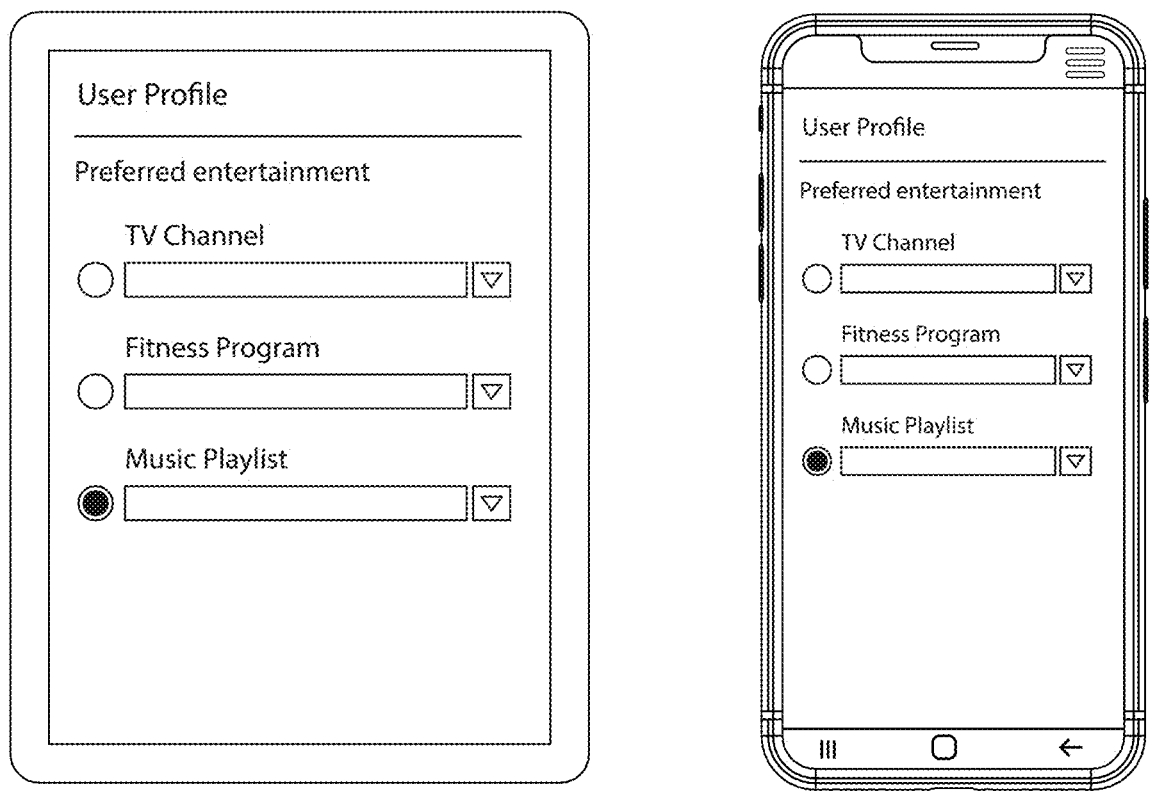

FIG. 8 illustrates an example of a smart gym equipment with a user interface touchscreen. In some embodiments, a person may create a new user profile or login into a previously created profile using the user interface of the smart gym equipment. FIG. 9 illustrates a user interface of a smart gym equipment or an application of a communication device paired with the smart gym equipment. In some embodiments, a person creates a new user profile by providing a name, a username, and a password. FIG. 10 illustrates a user interface of a smart gym equipment or an application of a communication device paired with the smart gym equipment. In some embodiments, a new user inputs their physical status including their gender, age, height, and body weight, and selects their exercise goals (e.g. weight loss, muscle gain, cardio, mild exercise, burn fat, etc.). FIG. 11 illustrates a user interface of a smart gym equipment or an application of a communication device paired to the smart gym equipment displaying a user profile with an avatar based on the user inputs when the profile was created. FIG. 12 illustrates a user interface of a smart gym equipment or an application of a communication device paired to the smart gym equipment. In some embodiments, a person may input a workout duration for an overall workout or manually select an exercise routine by choosing a particular exercise and setting a number of sets and repetitions for each chosen exercise. FIG. 13 illustrates a user interface of a smart gym equipment or an application of a communication device paired to the smart gym equipment allowing a person to select a target weight. FIG. 14 illustrates a user interface of a smart gym equipment or an application of a communication device paired to the smart gym equipment allowing a person to provide exercise history and exercise goals. FIG. 15 illustrates a user interface of a smart gym equipment or an application of a communication device paired to the smart gym equipment displaying workout history and provides an icon indicating incomplete repetitions or sets among exercises performed within an exercise session. FIG. 16 illustrates a user interface of a smart gym equipment or an application of a communication device paired with the smart gym equipment allowing a person to select a particular exercise from a list of preprogrammed exercises. FIGS. 17 and 18 illustrate a user interface of a smart gym equipment or an application of a communication device paired to the smart gym equipment allowing a person to provide exercise history, target exercise repetitions, and exercise settings, which could either be setting the exercise duration or manually indicating a number of sets and repetition. FIG. 19 illustrates a user interface of a smart gym equipment or an application of a communication device paired to the smart gym equipment displaying an exercise summary indicating a range of weight values during a particular exercise, at which set each weight value was recorded, and a total number of sets and repetition for the particular exercise. FIG. 20 illustrates a user interface of a smart gym equipment or an application of a communication device paired to the smart gym equipment allowing a person to choose a preferred entertainment option (e.g. TV channel, fitness program, music playlist, etc.).

Figure 21:
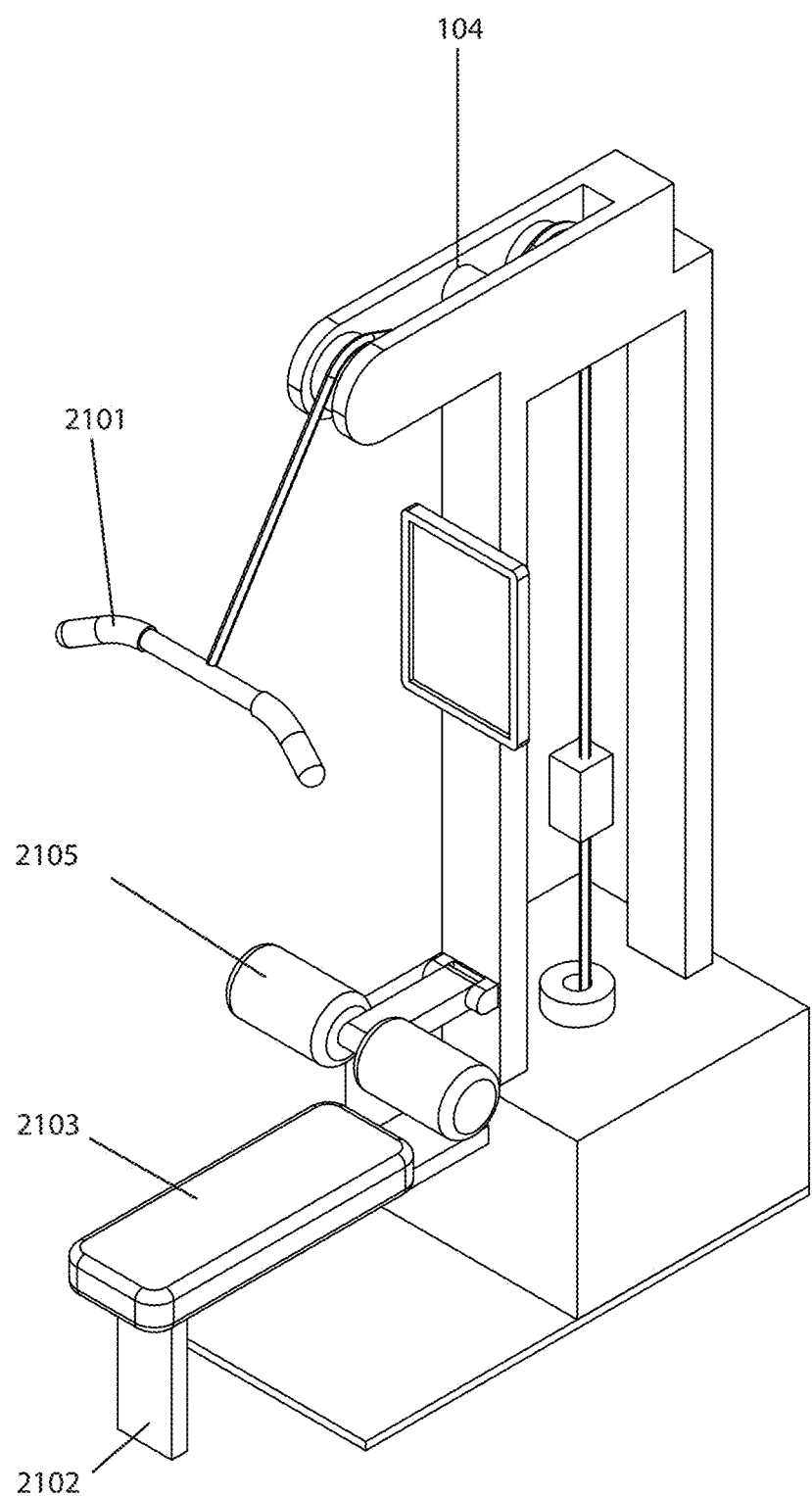
FIG. 21 illustrates examples of adjustable components of a smart gym equipment, according to some embodiments.
Figure 22A:
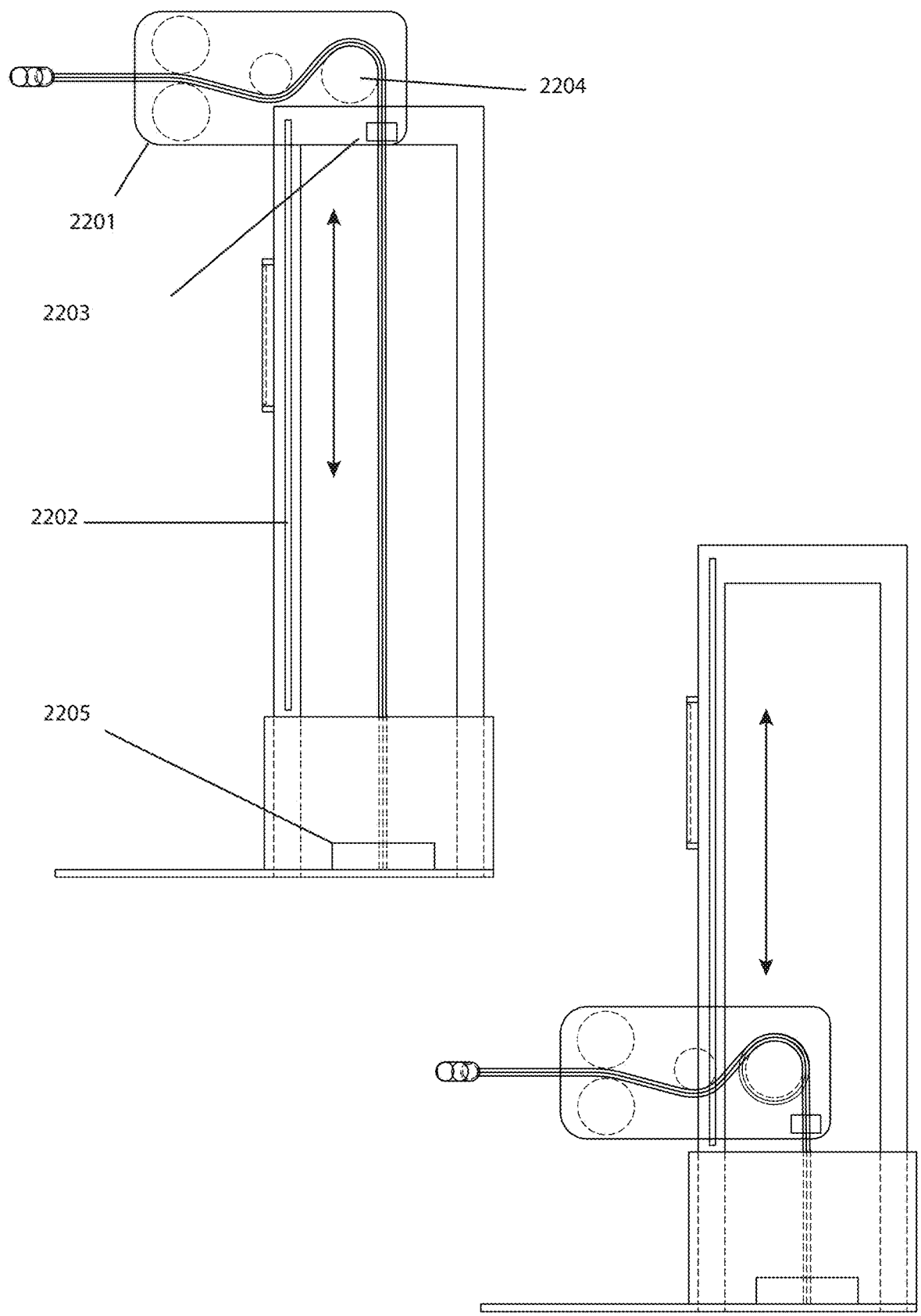
Figure 22B:
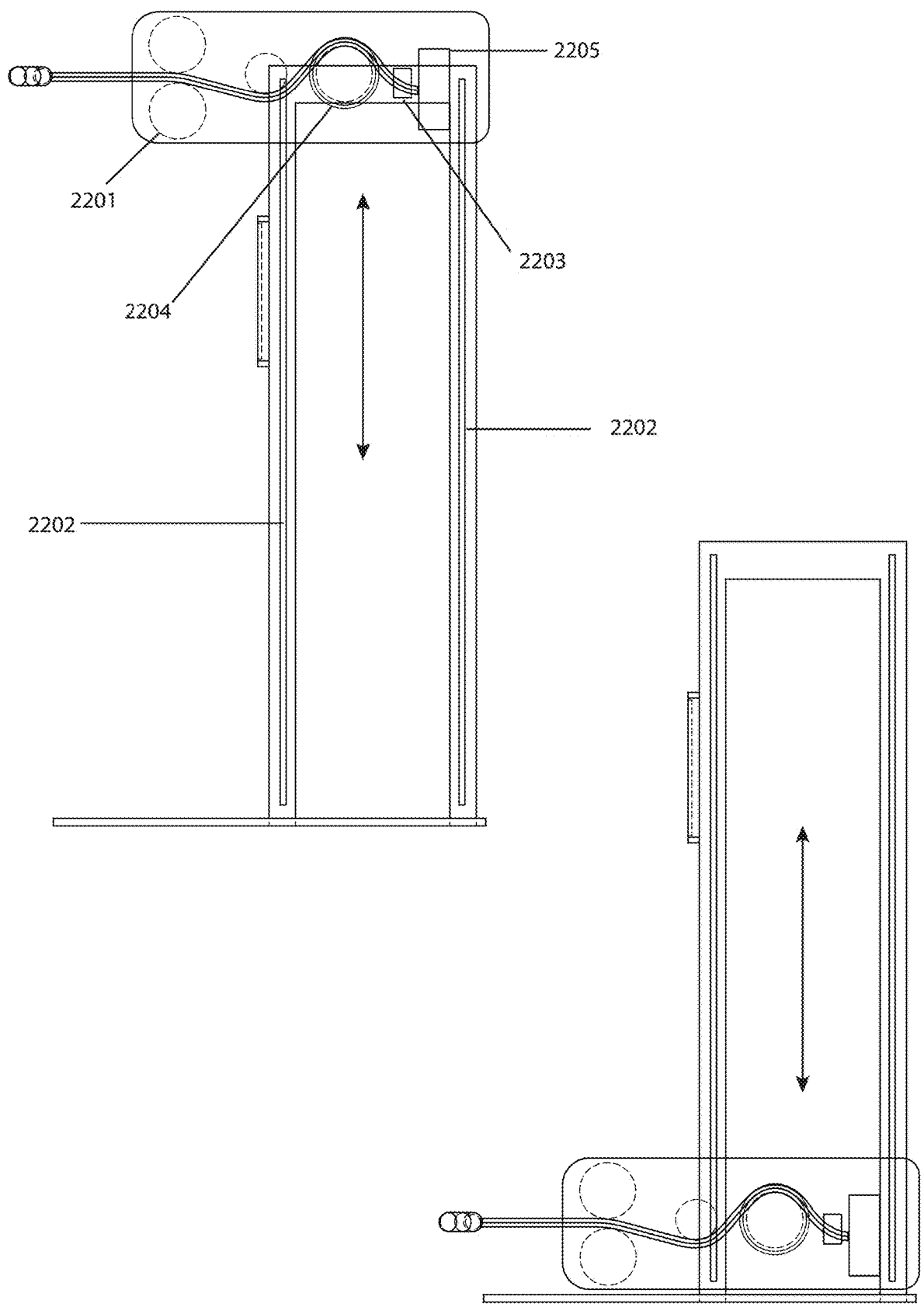
Figure 22C:
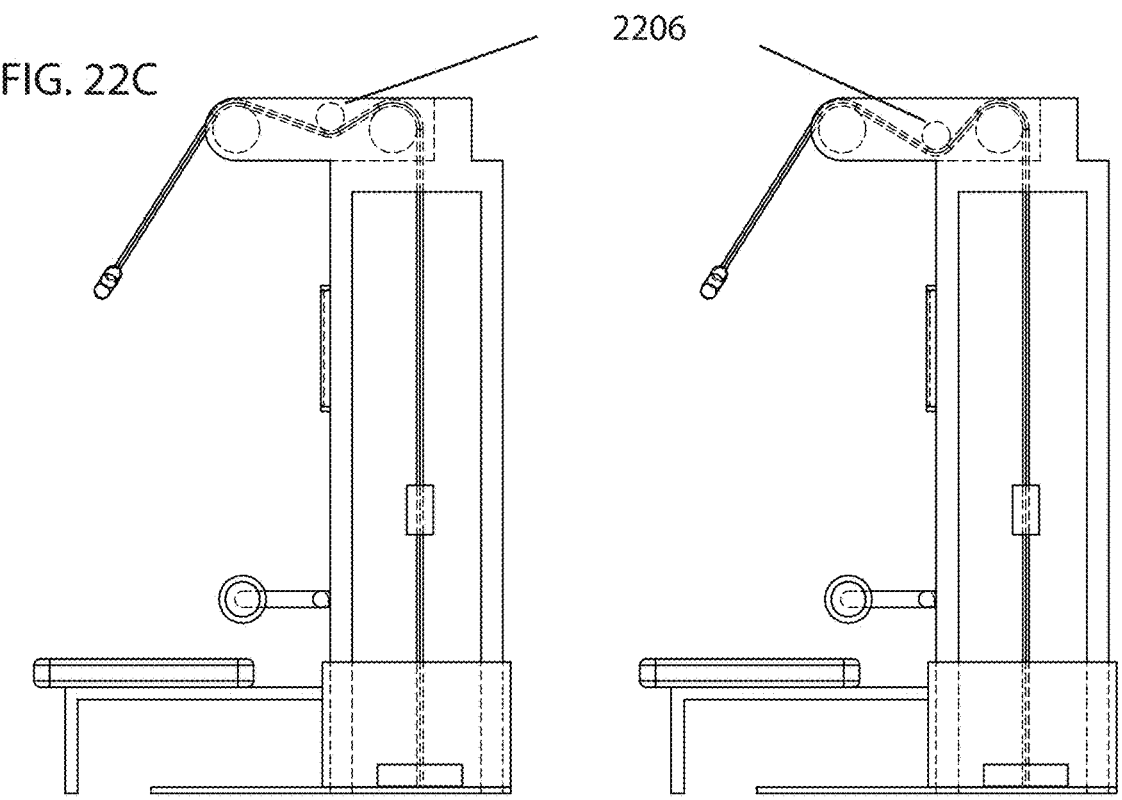
Figure 22D:
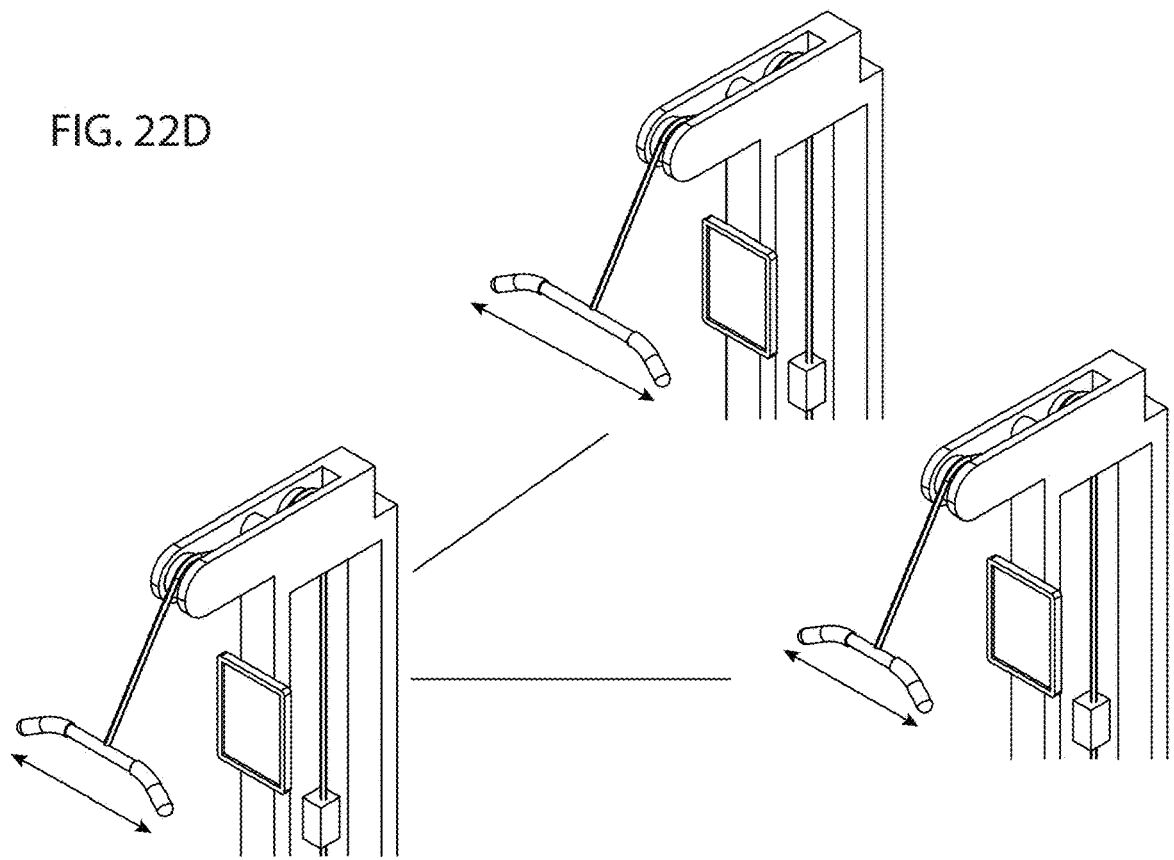
Figure 22G:
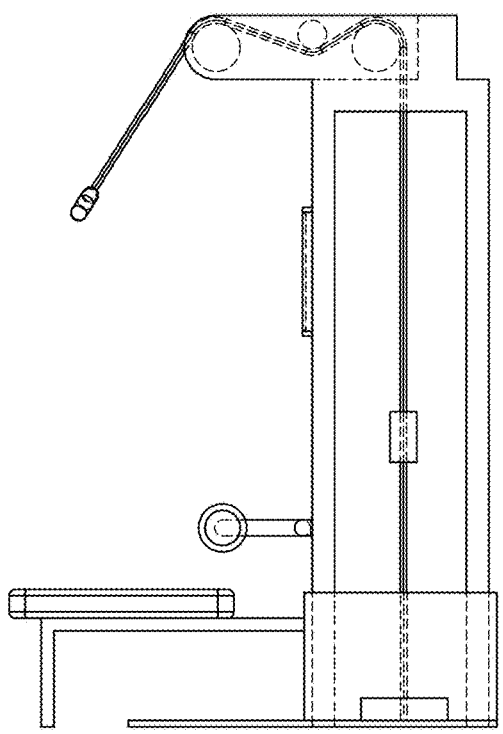
Figure 22G:
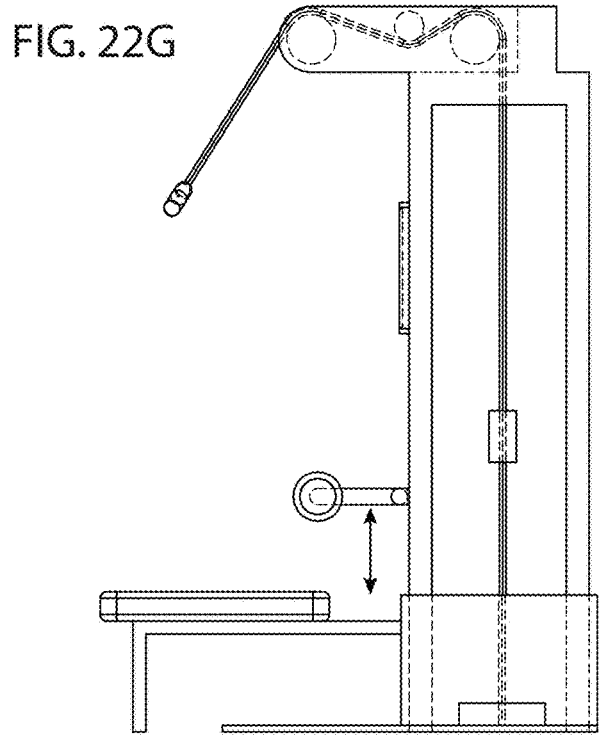
Figure 22H:
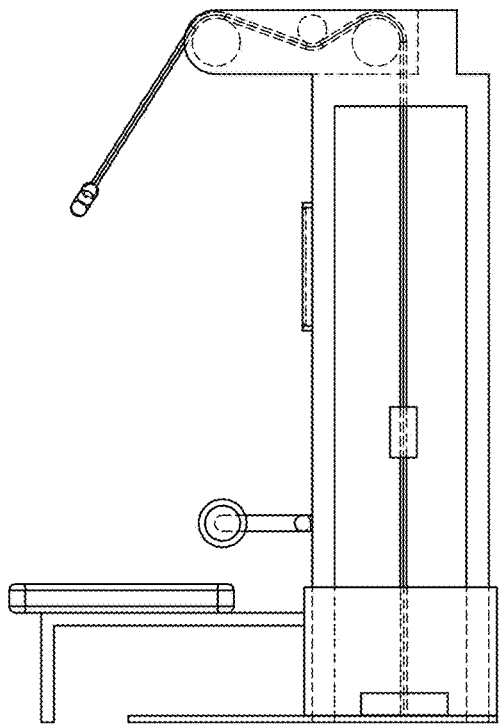
Figure 22H:
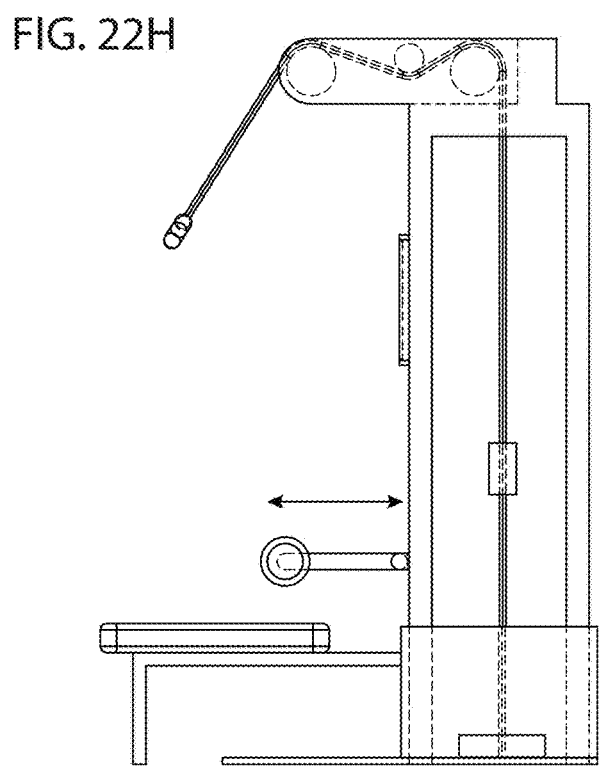

FIG. 21 illustrates examples of components of a smart gym equipment 2100. In some embodiments, a smart gym equipment includes a handle 2101, a bench 2102, a bench pad or a seat 2103, a pulley system 2104, and a roller or comfort roller 2105. FIG. 22A illustrates an adjustment to a smart gym equipment, particularly to a set of pulleys 2201 enabling various configurations of the smart gym equipment to perform various exercises. In some embodiments, the set of pulleys may be dragged or slided up and down a rail 2202 along with a weight sensor 2203. A pulley 2204 is able to reel in excess cables depending on a desired configuration of the smart gym equipment. In some configurations, an electric magnet 2205 remains on the base of the smart gym equipment. In some configurations, the electric magnet 2205 is coupled with the set of pulleys 2201, which can be dragged or slid up and down the smart gym equipment (FIG. 22B). FIG. 22C illustrates an adjustment to a pulley 2206. In some embodiments, the pulley 2206 may move up and down to provide more tension to cables. FIG. 22D illustrates an adjustment to handles of a smart gym equipment. In some embodiments, the handles may be extended or retracted depending on a desired type of exercise to be performed. FIG. 22E illustrates an adjustment to the seat of a smart gym equipment. In some embodiments, the height of the seat may be adjusted. In some embodiments, the bench may be adjusted to slide away or along with the seat (FIG. 22F). FIGS. 22G and 22H illustrate an adjustment to other components, wherein other components may be lifted up and down (FIG. 22G) or extended (FIG. 22H).

Figure 23:
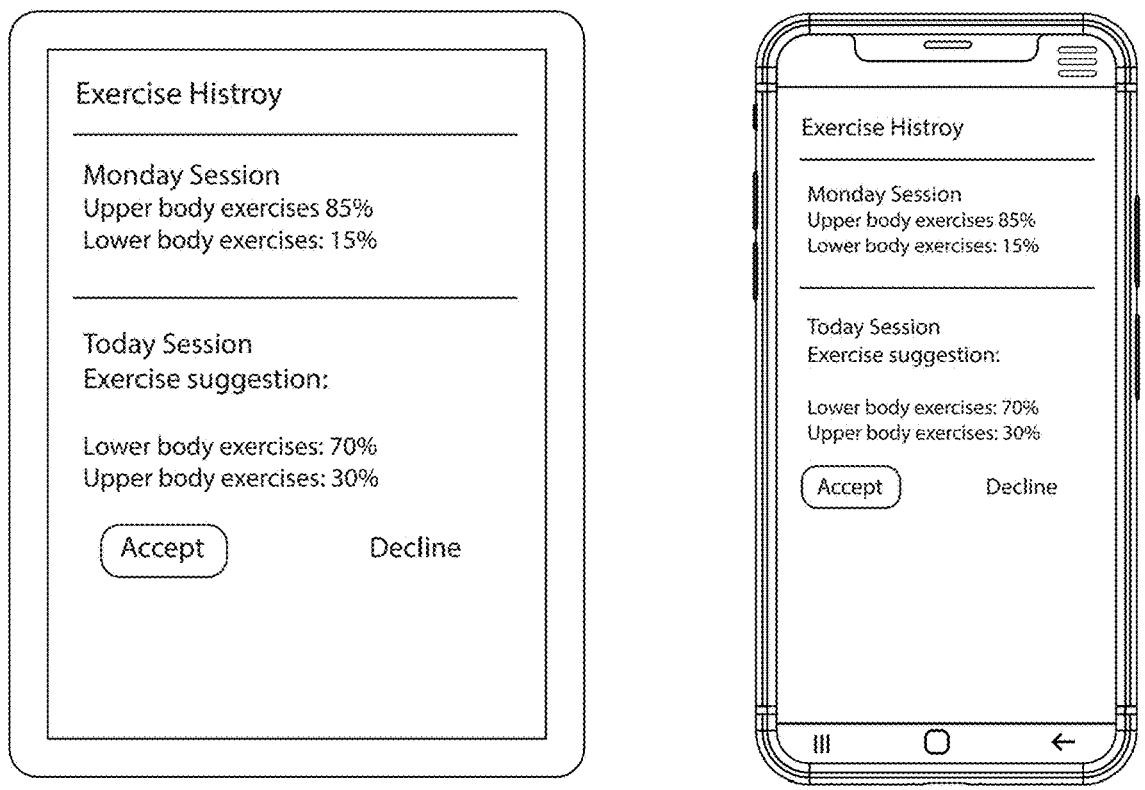
FIGS. 23-26 illustrate an example of a user interface of a smart gym equipment or a communication device providing exercise setting suggestions.
Figure 24:
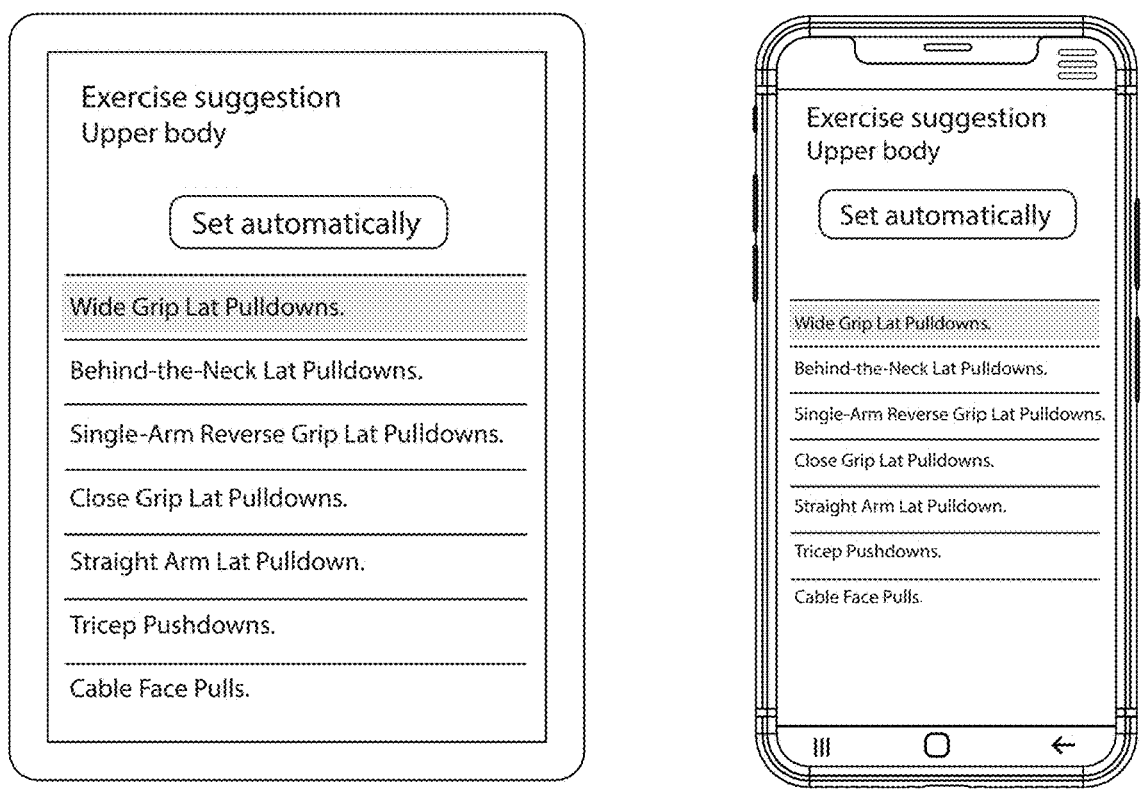
Figure 25:
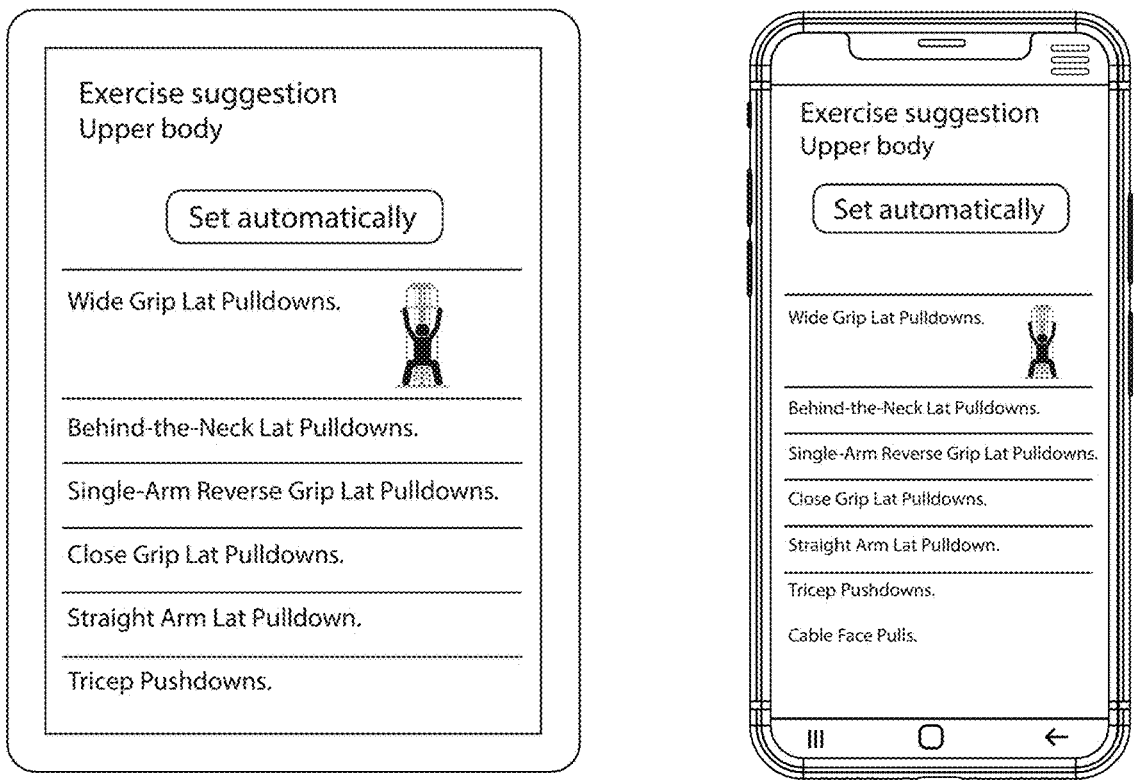
Figure 26:
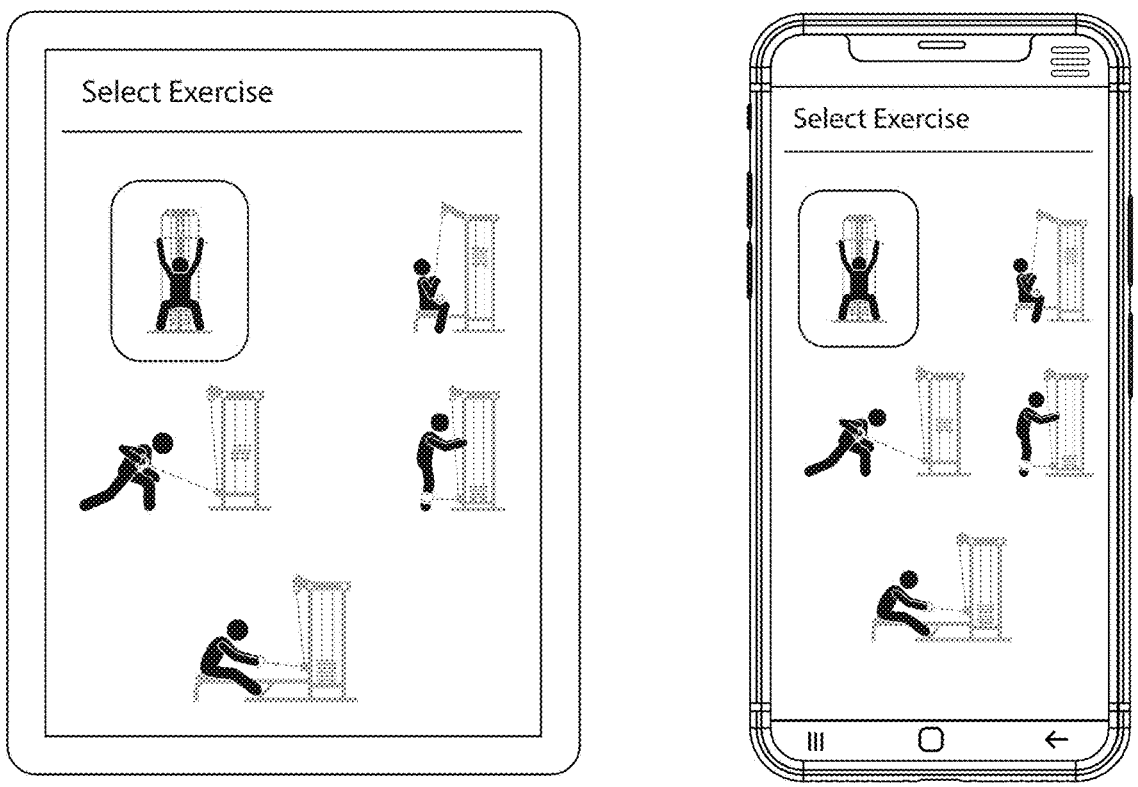

FIG. 23 illustrates a user interface of a smart gym equipment or an application of a communication device paired to the smart gym equipment displaying an exercise history and suggesting an exercise session based on the displayed exercise history. In some embodiments, the suggested exercise session may be accepted or declined by a person using the smart gym equipment. In some embodiment, the user interface of the smart gym equipment or the application of the communication device paired to the smart gym equipment allows a person to select a particular muscle group to work on and a selection of possible exercise routines and order of exercise routines for that particular muscle group (FIG. 24). FIG. 25 illustrates a user interface of a smart gym equipment or an application of a communication device paired to the smart gym equipment displaying each particular exercise routine with a brief animation to provide an overview of how a particular exercise routine is performed. In some embodiments, the user interface of the smart gym equipment or the application of the communication device paired to the smart gym equipment displays a full detail (using a video or a video animation) of the particular exercise routine which may be followed step by step by a person using the smart gym equipment.

FIG. 27 illustrates a smart gym equipment automatically adjusting the components of the smart gym equipment based on user preferences or historical data upon a person using the smart gym equipment logging into a particular user profile. In some embodiments, the adjustments include the height of the seat, the retraction of the handles, and other components. In some embodiments, each user profile provides a personalized exercise setting.

Figure 29:
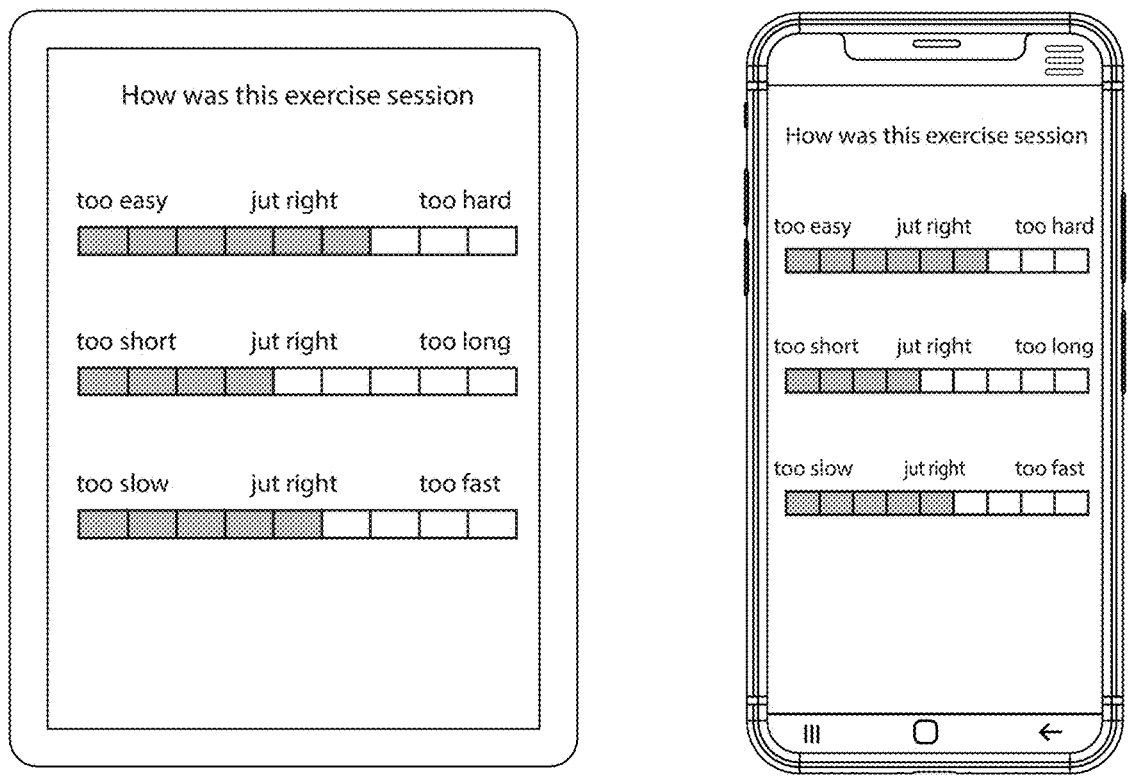
FIGS. 29 and 30 illustrate a user interface of a smart gym equipment or a communication device receiving feedback or ratings for an exercise session and providing suggestions based on the feedback or ratings.
Figure 30:
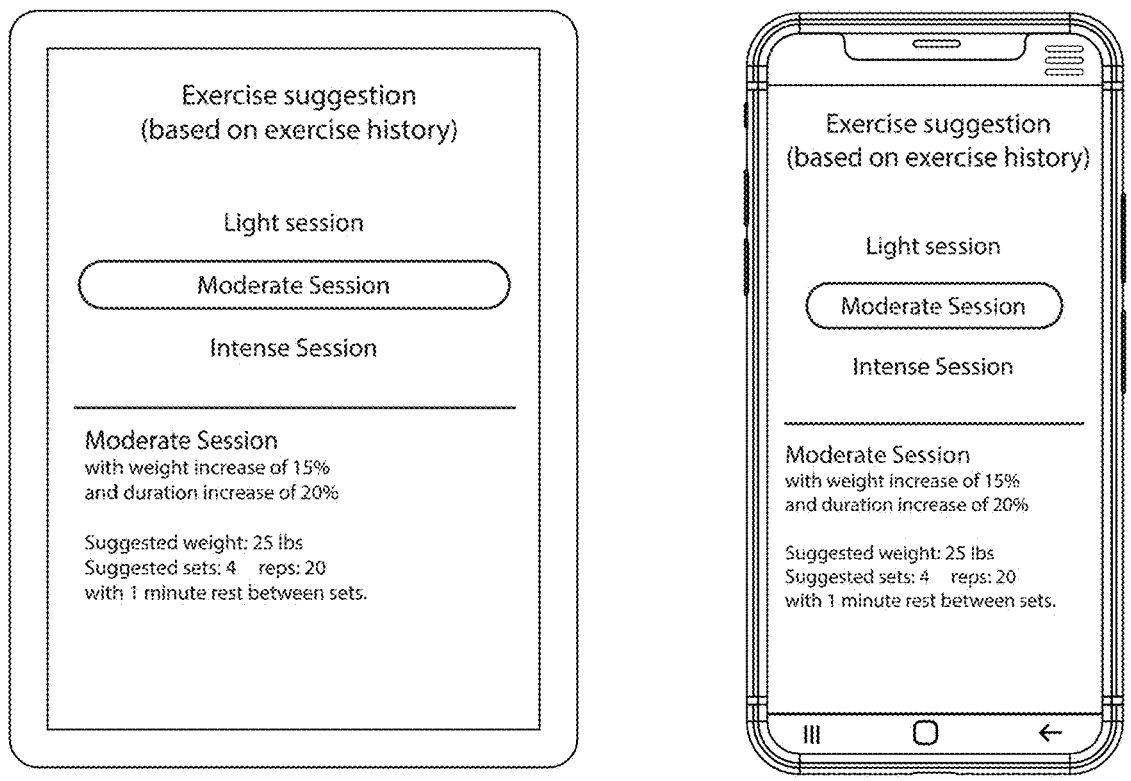

FIG. 28 illustrates a schematic diagram of an example of neural networks determining exercise equipment settings for a person based on historical input data (exercise type, body measurements, exercise history, etc), feedback and ratings, and real-time sensor readings. In some embodiment, a user interface of the smart gym equipment or an application of a communication device paired with the smart gym equipment allows a person using the smart gym equipment to rate a currently or previously finished exercise session (FIG. 29) and suggest to the person an exercise based on exercise history (FIG. 30).

Figure 31:
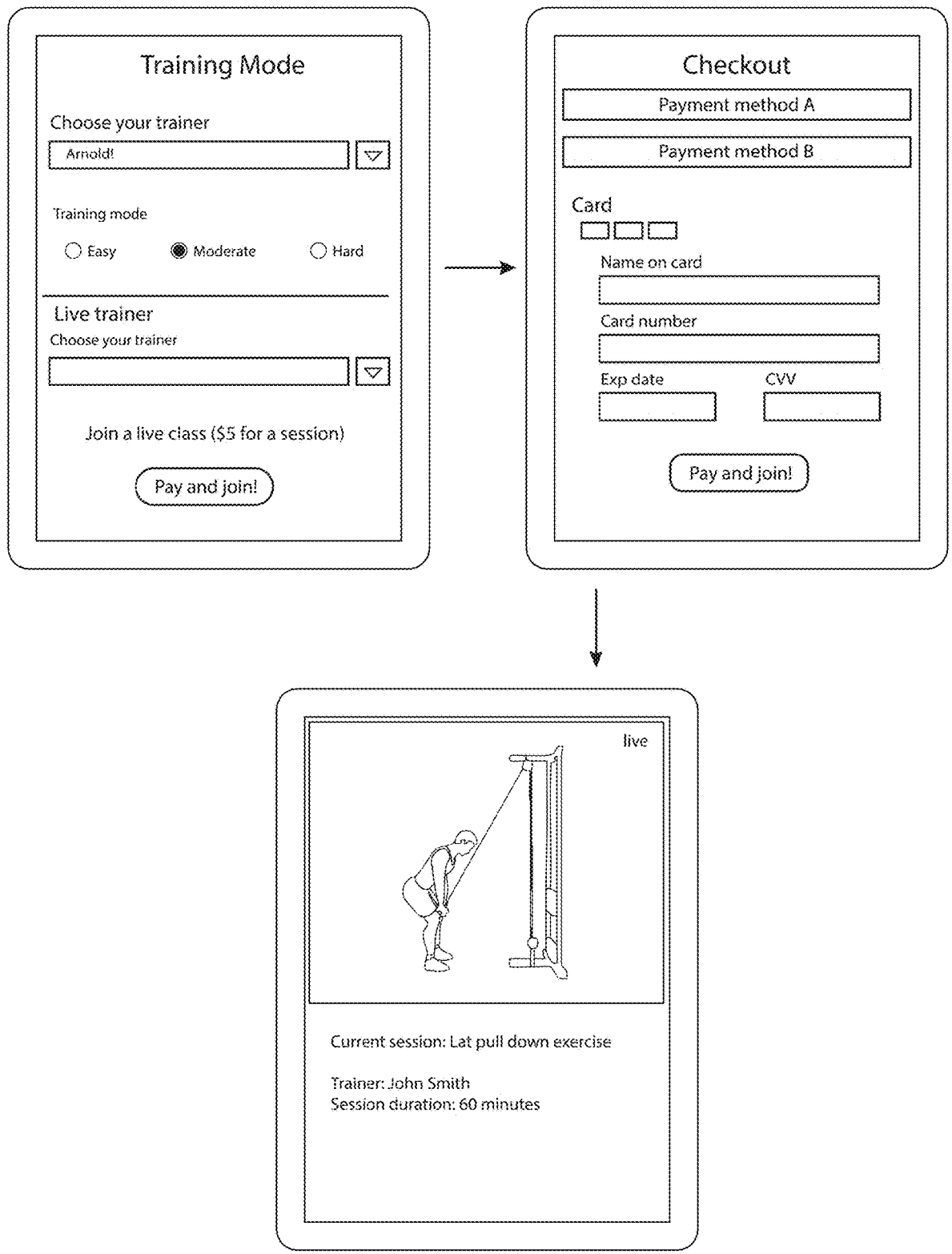
FIG. 31 illustrates an example of a training mode allowing a user to choose a trainer and pay for an exercise session with the trainer using a user interface of a smart gym equipment or a communication device, according to some embodiments.

FIG. 31 illustrates a user interface of a smart gym equipment or an application of a communication device paired to the smart gym equipment allowing a person using the smart gym equipment to choose a trainer or a coach and a training mode. In some embodiments, the person may opt to join a class or a private session with a trainer. In some embodiments, the training session may be a live-stream or recorded video training session. In some embodiments, the person may pay for the exercise session with the trainer or for joining a class using the user interface.

Figure 32:
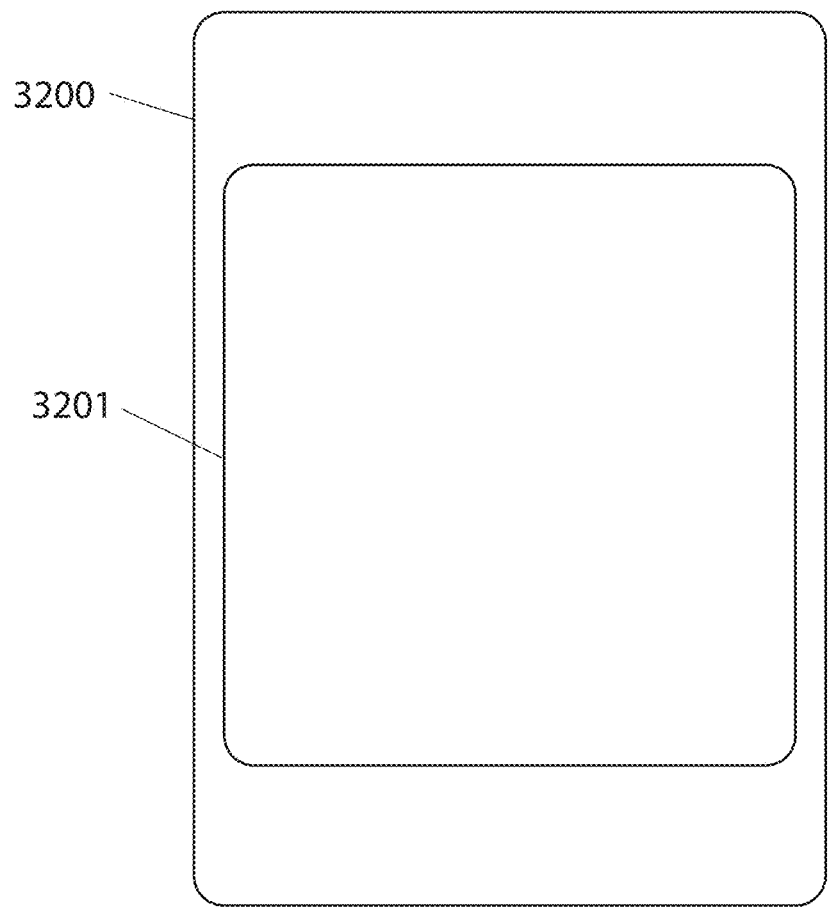
FIG. 32 illustrates an example of a communication device with a user interface touchscreen that may be paired with the smart gym equipment, according to some embodiments

FIG. 32 illustrates an example of a communication device, mobile device 3200 with user interface touchscreen 3201. Mobile device 3200 with touchscreen 3201 may be used to execute an application paired with the smart gym equipment. A person may provide input to the application (e.g., magnitude of weight value, particular exercise, age, body weight of the person, exercise goals, etc.) using the touchscreen and the application may transmit the input data to the processor of the smart gym equipment. The processor of the smart gym equipment may autonomously adjust equipment settings based on the input data received.

Figure 33:
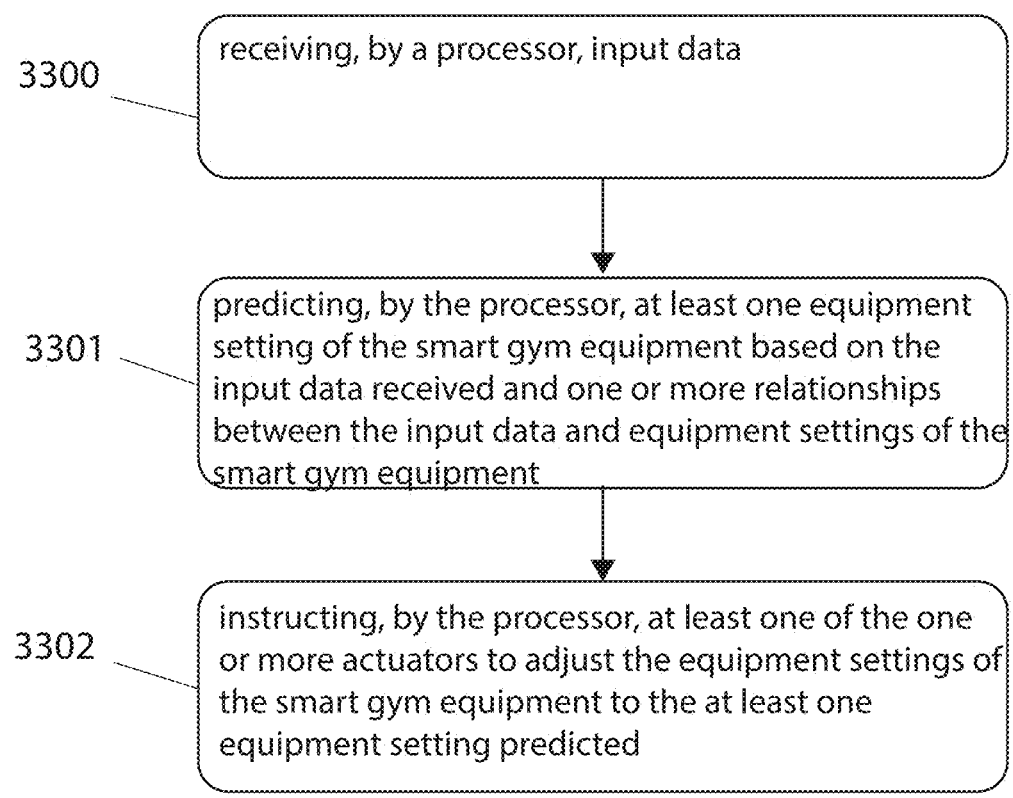
FIG. 33 illustrates a flowchart describing an example of a method for autonomously adjusting equipment settings of a smart gym equipment for a particular person, according to some embodiments.

FIG. 33 illustrates a flowchart describing an example of a method for autonomously adjusting equipment settings of a smart gym equipment for a particular person, including steps 3300, 3301, and 3302.

Figure 34:
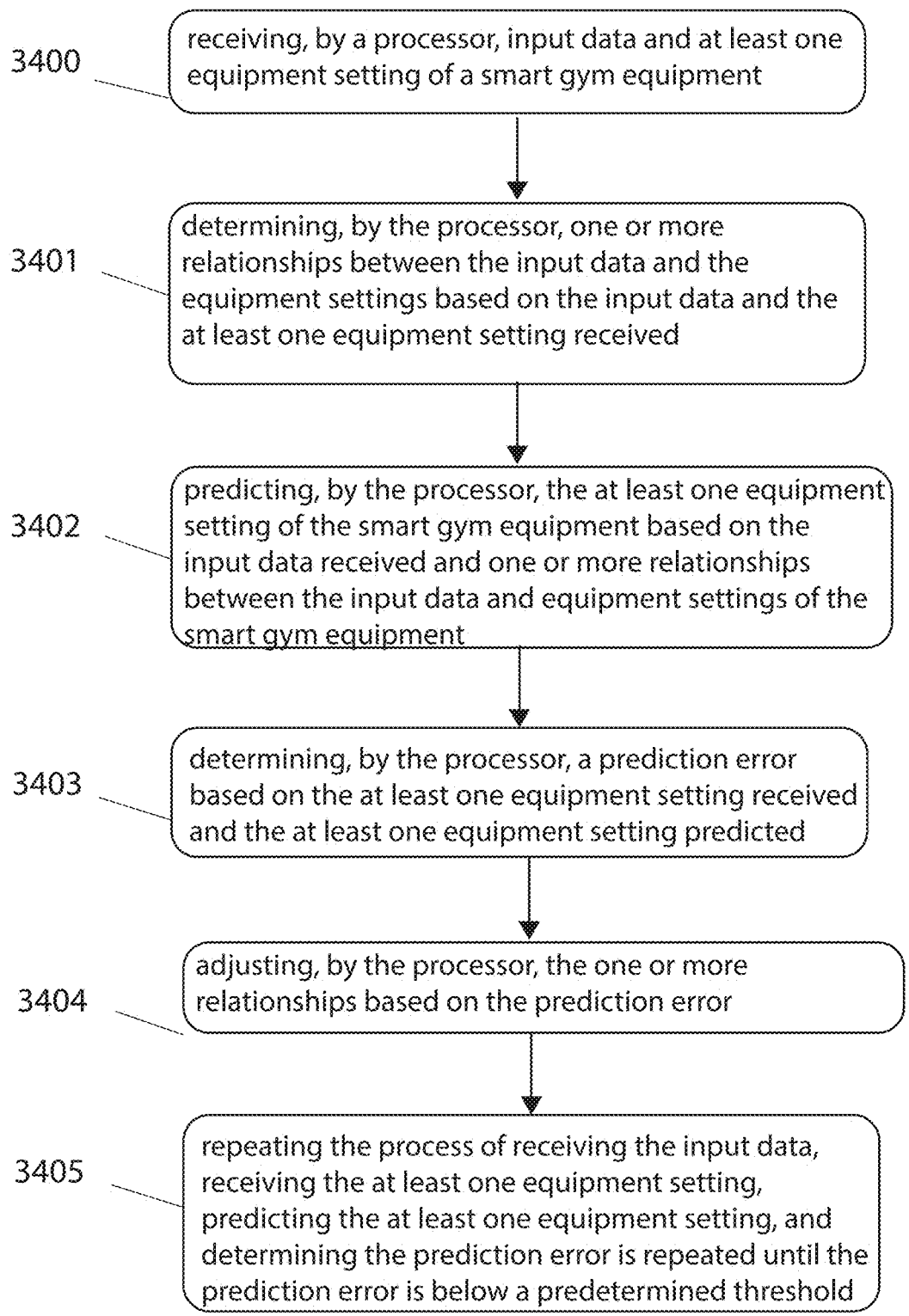
FIG. 34 illustrates a flowchart describing an example of a method for learning one or more relationships between input data and equipment settings of a smart gym equipment, according to some embodiments.

FIG. 34 illustrates a flowchart describing an example of a method for learning one or more relationships between input data and equipment settings of a smart gym equipment, including steps 3400, 3401, 3402, 3403, 3404, and 3405.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to the sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification, discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A device, comprising:
a smart gym equipment, comprising:
one or more sensors;
one or more actuators;
one or more electric magnets;
a processor; and
a tangible, non-transitory, machine-readable media storing instructions that when executed by the processor effectuates operations comprising:
adjusting resistance in continuous amounts during a weight-lifting training in relation to a pulled distance of a weight value, wherein:
a change of the weight value is proportional to the pull distance; and the weight value is adjusted by an adjustment in an electrical current flowing through a wire in the smart gym equipment thereby adjusting a strength of a magnetic field;
wherein:
the processor determines a value for the electrical current;
the adjustment in the electrical current is based on at least one sensed data; and the device receives and transmits data to an application of a communication device paired with the device.

2. The device of claim 1, further comprising:
determining, with the processor, a value for the electrical current based on training methods of a trainer chosen by a user.

3. The device of claim 2, wherein the training methods of the selected trainer are learned with neural networks and a backpropagation process.

4. The device of claim 2, wherein the application of the communication device displays pre-recorded or live-feed videos of the chosen trainer during exercise sessions.

5. The device of claim 1, wherein the strength of the magnetic field is determined based on machine learning or neural networks.

6. The device of claim 5, wherein a neural network utilizes a cost function.

7. The device of claim 1, wherein a magnitude of an increase or a decrease of the magnetic field is based on a user's trainer's method of training.

8. The device of claim 7, wherein the method used by the user's trainer is learned through backpropagation.

9. The device of claim 1, further comprising:
autonomously increasing or decreasing, with the processor, the strength of the magnetic field in a subsequent session based on a performance of a user in an exercise session.

10. The device of claim 9, further comprising:
receiving, with the processor, a rating for each session from the user; and
adjusting, with the processor, the subsequent sessions based on the ratings from the user.

11. The device of claim 1, wherein at least one of the one or more sensors measures force.

12. The device of claim 1, wherein the one or more sensors comprises at least one of: a force sensor, an optical encoder, an accelerometer, a weight sensor, an electrical current sensor, an imaging sensor, a depth sensor, a gyroscope, an odometer, an optical sensor, an extensometer, a speedometer, a timer, and a repetition counter.

13. The device of claim 1, wherein the processor reads the electrical current.

14. The device of claim 1, wherein the magnetic field creates the continuous amounts of resistance or stiffness.

15. The device of claim 1, wherein the smart gym equipment further comprises a pulley.

16. The device of claim 1, wherein the processor is configured to make a suggestion a user can accept or decline.

17. The device of claim 1, wherein when a user utilizes the application of the communication device to make a selection for a magnitude of a weight value for the exercise session, the processor is configured to adjust the weight value based on the user's selection.

18. The device of claim 1, wherein the processor stores the sensed data collected by at least one of the one or more sensors in a memory.

19. The device of claim 18, wherein the processor stores the sensed data for one or more users and adjusts at least one equipment setting for each user based on the sensed data received.

20. The device of claim 19, wherein:
a value of the at least one equipment setting is received from the application of the communication device.

21. The device of claim 20, wherein the device further comprises:
instructing, with the processor, at least one of the one or more actuators to implement the value of the at least one equipment setting received.

22. The device of claim 21, wherein the processor determines suggested equipment settings for a particular user based on at least one of: an exercise history, sensor data history, a fitness level, a weight, and an age of the particular user.

23. The device of claim 1, wherein at least one of the one or more actuators adjusts a height, a position, and an angle of a component of the smart gym equipment.

24. The device of claim 1, wherein the device is configured such that a user can select a duration for performing an exercise, a number of repetitions for an exercise, and a change in the magnitude of the weight value during an exercise.

25. The device of claim 1, wherein the device is configured such that a user can select one of: an order of exercises performed during an exercise session, a height of a component of the smart gym equipment for a particular exercise, an angle of a component of the smart gym equipment for a particular exercise, a position of a component of the smart gym equipment for a particular exercise, a total duration of an exercise session, and a television channel or program to display on a screen of the smart gym equipment.

26. The device of claim 1, wherein the at least one of: a name of a user, an age of the user, a weight of the user, a height of the user, a preferred duration of exercise, preferred exercises, an exercise schedule, a target weight of the user, a target lifting weight for a particular exercise, a target number of repetitions for a particular exercise, a target duration for a particular exercise, previous exercises performed, weights lifted for previous exercises performed, duration of previous exercises performed, a number of repetitions for previous exercises performed, a level of completion of previous repetitions performed, a maximum weight lifted for previous exercises performed, a total duration of exercise sessions, is received from the application of the communication device.

27. The device of claim 1, wherein the processor determines a suggested exercise unique to a particular user based on an exercise history, sensor data history, a fitness level, a weight, and an age of the particular user.

28. The device of claim 1, wherein the application of the communication device paired with the device is configured to:
    receive at least one input designating a particular muscle group; and
    display a selection of possible exercise routines for the particular muscle group selected.

29. The device of claim 1, wherein one of: a preferred height of a component of the smart gym equipment for a particular exercise, a preferred angle of a component of the smart gym equipment for a particular exercise, and a preferred position of a component of the smart gym equipment for a particular exercise configured to be received by the device from a user.

* * * * *